US010373290B2

(12) United States Patent
Chen et al.

(10) Patent No.: US 10,373,290 B2
(45) Date of Patent: Aug. 6, 2019

(54) ZOOMABLE DIGITAL IMAGES

(71) Applicant: SAP SE, Walldorf (DE)

(72) Inventors: Han Xiang Chen, Burnaby (CA); Letao Chen, Burnaby (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/614,366

(22) Filed: Jun. 5, 2017

(65) Prior Publication Data

US 2018/0350034 A1 Dec. 6, 2018

(51) Int. Cl.
*G06T 3/40* (2006.01)

(52) U.S. Cl.
CPC .................................... *G06T 3/40* (2013.01)

(58) Field of Classification Search
CPC ..... G06T 3/40; G06T 7/11; G06T 7/90; G06T 2207/30004; G06T 2207/10056; G06T 2200/24; G06T 2219/2016
See application file for complete search history.

(56) References Cited

U.S. PATENT DOCUMENTS 4,589,029 A * 5/1986 Torimaru ........... H04N 5/23293 345/671
5,781,195 A * 7/1998 Marvin .................. G06T 11/00 345/428
5,959,670 A * 9/1999 Tamura .................... G06T 3/40 348/229.1
6,704,048 B1 * 3/2004 Malkin .................... G06T 3/40 348/14.1
6,809,747 B1 * 10/2004 Ichioka ................. H04H 60/13 348/E5.098
7,248,262 B2 * 7/2007 Cao ...................... G06T 3/4092 345/419
8,031,206 B2 * 10/2011 Shoemaker .............. G06T 3/40 345/619
8,711,426 B2 * 4/2014 Yokozawa ......... H04N 1/40068 358/1.16
8,836,721 B1 * 9/2014 Wichary ................. G09G 5/14 345/629
8,836,821 B2 * 9/2014 Kurokawa ......... H04N 5/23296 348/240.1
8,873,886 B2 * 10/2014 Fukazawa ............ G06T 3/0012 382/298

(Continued)

*Primary Examiner* — Devona E Faulk
*Assistant Examiner* — Charles L Beard
(74) *Attorney, Agent, or Firm* — Fountainhead Law Group P.C.

(57) ABSTRACT

Some embodiments provide a non-transitory machine-readable medium that stores a program. The program reads a file representing a source image. The file specifies an interior image and a set of successive exterior images that correspond to a set of successive zoom levels. The interior image includes a plurality of pixels. Each pixel in the interior image has a particular size. Each exterior image in the set of successive exterior images includes a plurality of pixels configured to encompass the interior image. The plurality of pixels of each successive interior image have a successively larger size than the particular size. The program generates the source image based on the interior image and the set of successive exterior images. The program receives a selection of a zoom level in the set of successive zoom levels. The program generates a target image based on the selected zoom level and the source image.

20 Claims, 18 Drawing Sheets

(56) References Cited

U.S. PATENT DOCUMENTS

| | | | | | |
|---|---|---|---|---|---|
| 9,256,917 | B1 * | 2/2016 | Khafizova | G06F 3/0482 | |
| 9,325,899 | B1 * | 4/2016 | Chou | G06T 7/593 | |
| 9,360,339 | B2 * | 6/2016 | Roegelein | G09B 29/106 | |
| 9,390,548 | B2 * | 7/2016 | Schmidt | G06T 15/08 | |
| 9,532,008 | B2 * | 12/2016 | Ohnishi | G03B 21/26 | |
| 9,633,167 | B2 * | 4/2017 | Yoshioka | G06F 19/321 | |
| 9,635,091 | B1 * | 4/2017 | Laukkanen | H04L 67/025 | |
| 9,836,866 | B2 * | 12/2017 | Cheung | G06T 11/60 | |
| 9,842,378 | B2 * | 12/2017 | Charlebois | G06T 1/60 | |
| 9,992,421 | B2 * | 6/2018 | Tsubusaki | H04N 5/23296 | |
| 10,025,477 | B1 * | 7/2018 | Khafizova | G06F 3/1204 | |
| 2001/0014182 | A1 * | 8/2001 | Funayama | H04N 1/3872 | 382/282 |
| 2001/0026643 | A1 * | 10/2001 | Yamada | G06T 3/4084 | 382/276 |
| 2005/0174362 | A1 * | 8/2005 | Lee | G06T 3/40 | 345/660 |
| 2005/0195157 | A1 * | 9/2005 | Kramer | G06F 3/04845 | 345/156 |
| 2005/0270311 | A1 * | 12/2005 | Rasmussen | G01C 21/32 | 345/677 |
| 2006/0034543 | A1 * | 2/2006 | Bacus | G02B 21/367 | 382/284 |
| 2006/0087520 | A1 * | 4/2006 | Ito | G06F 3/0481 | 345/660 |
| 2006/0164441 | A1 * | 7/2006 | Wada | G06F 3/0481 | 345/649 |
| 2006/0170793 | A1 * | 8/2006 | Pasquarette | H04N 5/23293 | 348/240.99 |
| 2007/0146392 | A1 * | 6/2007 | Feldman | G06T 3/0025 | 345/660 |
| 2007/0146503 | A1 * | 6/2007 | Shiraki | H04N 3/1593 | 348/231.3 |
| 2008/0079754 | A1 * | 4/2008 | Kuroki | H04N 5/45 | 345/660 |
| 2008/0219553 | A1 * | 9/2008 | Akiyama | G06K 9/38 | 382/173 |
| 2009/0040238 | A1 * | 2/2009 | Ito | G06F 3/0481 | 345/660 |
| 2010/0064593 | A1 * | 3/2010 | Dumm | C09K 3/1409 | 51/306 |
| 2010/0073371 | A1 * | 3/2010 | Ernst | G09G 5/393 | 345/428 |
| 2010/0074515 | A1 * | 3/2010 | Zhao | G01N 25/72 | 382/149 |
| 2010/0079496 | A1 * | 4/2010 | Hiraoka | G06T 3/40 | 345/660 |
| 2010/0118160 | A1 * | 5/2010 | Tsurumi | G06T 3/0087 | 348/231.2 |
| 2010/0171759 | A1 * | 7/2010 | Nickolov | G06T 3/40 | 345/634 |
| 2010/0287493 | A1 * | 11/2010 | Majumder | G06F 3/0481 | 715/788 |
| 2011/0074819 | A1 * | 3/2011 | Yamaji | G06F 17/30247 | 345/634 |
| 2011/0128367 | A1 * | 6/2011 | Yoshioka | G06T 1/00 | 348/79 |
| 2011/0131376 | A1 * | 6/2011 | Fischer | G06F 17/30241 | 711/119 |
| 2011/0157413 | A1 * | 6/2011 | Yoshida | H04N 9/735 | 348/223.1 |
| 2011/0191014 | A1 * | 8/2011 | Feng | G01C 21/00 | 701/532 |
| 2012/0062732 | A1 * | 3/2012 | Marman | H04N 7/18 | 348/142 |
| 2012/0092525 | A1 * | 4/2012 | Kusaka | H04N 5/2628 | 348/231.99 |
| 2012/0147246 | A1 * | 6/2012 | Dent | H04N 1/0044 | 348/333.12 |
| 2012/0162264 | A1 * | 6/2012 | Hughes | G06T 11/00 | 345/660 |
| 2012/0188246 | A1 * | 7/2012 | Cheung | G06T 3/40 | 345/428 |
| 2012/0281119 | A1 * | 11/2012 | Ohba | H04N 9/8205 | 348/240.2 |
| 2013/0021374 | A1 * | 1/2013 | Miao | G06F 3/011 | 345/633 |
| 2013/0101214 | A1 * | 4/2013 | Sample | G09B 29/003 | 382/173 |
| 2013/0108171 | A1 * | 5/2013 | Ptucha | G06K 9/00228 | 382/195 |
| 2013/0108175 | A1 * | 5/2013 | Ptucha | G06T 11/60 | 382/199 |
| 2013/0135347 | A1 * | 5/2013 | Inada | G09G 5/395 | 345/629 |
| 2013/0249952 | A1 * | 9/2013 | Kusakabe | G06T 3/40 | 345/671 |
| 2014/0184778 | A1 * | 7/2014 | Takayama | G02B 21/367 | 348/79 |
| 2014/0247285 | A1 * | 9/2014 | Ohba | G06T 11/00 | 345/660 |
| 2014/0292813 | A1 * | 10/2014 | Takayama | G02B 21/367 | 345/634 |
| 2014/0375678 | A1 * | 12/2014 | Kjeldergaard | G06T 3/40 | 345/629 |
| 2015/0055890 | A1 * | 2/2015 | Lundin | G06T 11/60 | 382/306 |
| 2015/0185990 | A1 * | 7/2015 | Thompson | G06F 3/0484 | 715/800 |
| 2015/0262330 | A1 * | 9/2015 | Murakami | G06F 3/0481 | 345/661 |
| 2015/0363103 | A1 * | 12/2015 | Natsuyama | G06F 3/0488 | 715/773 |
| 2015/0371365 | A1 * | 12/2015 | Tarvainen | H04N 5/23296 | 345/667 |
| 2016/0021315 | A1 * | 1/2016 | Tsubusaki | H04N 5/23216 | 348/240.1 |
| 2016/0021316 | A1 * | 1/2016 | Tsubusaki | H04N 5/23296 | 348/240.1 |
| 2016/0054453 | A1 * | 2/2016 | Moriyasu | G01T 1/2985 | 378/19 |
| 2016/0117798 | A1 * | 4/2016 | Lin | G06T 3/40 | 345/667 |
| 2016/0133044 | A1 * | 5/2016 | Lynch | G09B 29/007 | 382/103 |
| 2016/0317455 | A1 * | 11/2016 | Blanco | A61K 47/48969 | |
| 2017/0011064 | A1 * | 1/2017 | Mercer | G06F 17/30241 | |
| 2017/0142404 | A1 * | 5/2017 | Maleki | G06T 17/05 | |
| 2017/0147174 | A1 * | 5/2017 | Olejniczak | G06F 3/04817 | |
| 2017/0186206 | A1 * | 6/2017 | Lin | G09B 29/007 | |
| 2017/0213318 | A1 * | 7/2017 | Yoshioka | G06T 3/40 | |
| 2017/0287436 | A1 * | 10/2017 | Korzunov | G06T 3/4092 | |
| 2017/0287437 | A1 * | 10/2017 | Korzunov | G09G 5/006 | |
| 2017/0299842 | A1 * | 10/2017 | Posa | G02B 7/09 | |
| 2017/0365093 | A1 * | 12/2017 | Stacey | G06F 17/30241 | |
| 2018/0039261 | A1 * | 2/2018 | Haller | G05B 23/0221 | |
| 2018/0056605 | A1 * | 3/2018 | Chen | B29C 67/0066 | |
| 2018/0070010 | A1 * | 3/2018 | Wang | H04N 5/23238 | |
| 2018/0077315 | A1 * | 3/2018 | Gondek | H04N 1/3935 | |
| 2018/0089875 | A1 * | 3/2018 | Cheung | G09G 5/14 | |
| 2018/0101933 | A1 * | 4/2018 | Rasmussen | G06Q 40/12 | |

* cited by examiner

ZOOMABLE DIGITAL IMAGES

BACKGROUND

Many operations may be performed on a digital image when using software (e.g., an application, a tool, etc.) configured to view the digital image. For instance, such software may allow a user to pan the digital image, rotate the digital image, zoom in on the digital image, modify pixels of the digital image, apply filters to the digital image, adjust colors of pixels of the digital image, etc. When zooming in on a digital image, the image quality may be maintained if the resolution of the zoomed digital image is greater than or equal to the resolution of the display on which the digital image is displayed. Otherwise, the image quality of the zoomed digital image may be lost.

SUMMARY

In some embodiments, a non-transitory machine-readable medium stores a program. The program reads a file representing a source image. The file specifies an interior image and a set of successive exterior images that correspond to a set of successive zoom levels. The interior image includes a plurality of pixels. Each pixel in the interior image has a particular size. Each exterior image in the set of successive exterior images includes a plurality of pixels configured to encompass the interior image. The plurality of pixels of each successive interior image have a successively larger size than the particular size. The program further generates the source image based on the interior image and the set of successive exterior images. The program also receives a selection of a zoom level in the set of successive zoom levels. The program further generates a target image based on the selected zoom level and the source image.

In some embodiments, generating the target image may include determining a subset of the set of successive exterior images based on the selected zoom level and generating pixels of the target image based on the subset of the set of successive exterior images. The program may further display the target image on a display of the device.

In some embodiments, generating the source image may include dividing the set of successive exterior images into a plurality of groups of successive exterior images generating a plurality of subimages. Each subimage in the plurality of subimages may include an interior image and a subset of the plurality of groups of successive exterior images. Generating the target image may include identifying the subset of the plurality of groups of successive exterior images corresponding to the selected zoom level and generating the target image based on the identified subset of the plurality of groups of successive exterior images.

In some embodiments, generating the target image may include, for each pixel in the target image, determining colors of the pixel in the target image based on colors of pixels in the source image overlapped by the pixel in the target image. Determining, for each pixel in the target image, the colors of the pixel in the target image may be further based on areas of portions of the pixels in the source overlapped by the pixel in the target image.

In some embodiments, a method reads a file representing a source image. The file specifies an interior image and a set of successive exterior images that correspond to a set of successive zoom levels. The interior image includes a plurality of pixels. Each pixel in the interior image has a particular size. Each exterior image in the set of successive exterior images includes a plurality of pixels configured to encompass the interior image. The plurality of pixels of each successive interior image have a successively larger size than the particular size. The method further generates the source image based on the interior image and the set of successive exterior images. The method also receives a selection of a zoom level in the set of successive zoom levels. The method further generates a target image based on the selected zoom level and the source image.

In some embodiments, generating the target image may include determining a subset of the set of successive exterior images based on the selected zoom level and generating pixels of the target image based on the subset of the set of successive exterior images. The method may further display the target image on a display of the device.

In some embodiments, generating the source image may include dividing the set of successive exterior images into a plurality of groups of successive exterior images and generating a plurality of subimages. Each subimage in the plurality of subimages may include an interior image and a subset of the plurality of groups of successive exterior images. Generating the target image may include identifying the subset of the plurality of groups of successive exterior images corresponding to the selected zoom level and generating the target image based on the identified subset of the plurality of groups of successive exterior images.

In some embodiments, generating the target image may include, for each pixel in the target image, determining colors of the pixel in the target image based on colors of pixels in the source image overlapped by the pixel in the target image. Determining, for each pixel in the target image, the colors of the pixel in the target image may be further based on areas of portions of the pixels in the source overlapped by the pixel in the target image.

In some embodiments, a system includes a set of processing units and a non-transitory computer-readable medium that stores instructions. The instructions cause at least one processing unit to read a file representing a source image. The file specifies an interior image and a set of successive exterior images that correspond to a set of successive zoom levels. The interior image includes a plurality of pixels. Each pixel in the interior image has a particular size. Each exterior image in the set of successive exterior images includes a plurality of pixels configured to encompass the interior image. The plurality of pixels of each successive interior image have a successively larger size than the particular size. The instructions further cause the at least one processing unit to generate the source image based on the interior image and the set of successive exterior images. The instructions also cause the at least one processing unit to receive a selection of a zoom level in the set of successive zoom levels. The instructions further cause the at least one processing unit to generate a target image based on the selected zoom level and the source image.

In some embodiments, generating the target image may include determining a subset of the set of successive exterior images based on the selected zoom level and generating pixels of the target image based on the subset of the set of successive exterior images. The instructions may further cause the at least one processing unit to display the target image on a display of the device.

In some embodiments, generating the source image may include dividing the set of successive exterior images into a plurality of groups of successive exterior images and generating a plurality of subimages. Each subimage in the plurality of subimages may include an interior image and a subset of the plurality of groups of successive exterior images. Generating the target image may include identifying the subset of the plurality of groups of successive exterior images corresponding to the selected zoom level and generating the target image based on the identified subset of the plurality of groups of successive exterior images.

In some embodiments, generating the target image may include, for each pixel in the target image, determining colors of the pixel in the target image based on colors of pixels in the source image overlapped by the pixel in the target image and areas of portions of the pixels in the source overlapped by the pixel in the target image.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing zoomable digital images that may be viewed and zoomed in on without loss of quality. In some embodiments, such zoomable digital images may be represented using an interior image and several exterior images. The interior image can be associated with the highest zoom level at which the digital image may be viewed and each exterior image can be associated with lower zoom levels at which the digital image may be viewed. In some embodiments, a zoomable digital image may be created by defining an interior image and a set of exterior images of the zoomable digital image and storing the zoomable digital image in a file that includes the interior image and the set of exterior images. A zoomable digital image can be viewed by reading the file of the zoomable digital image and generating a portion of the zoomable digital image for viewing based on the interior image and the set of exterior images.

Figure 1:
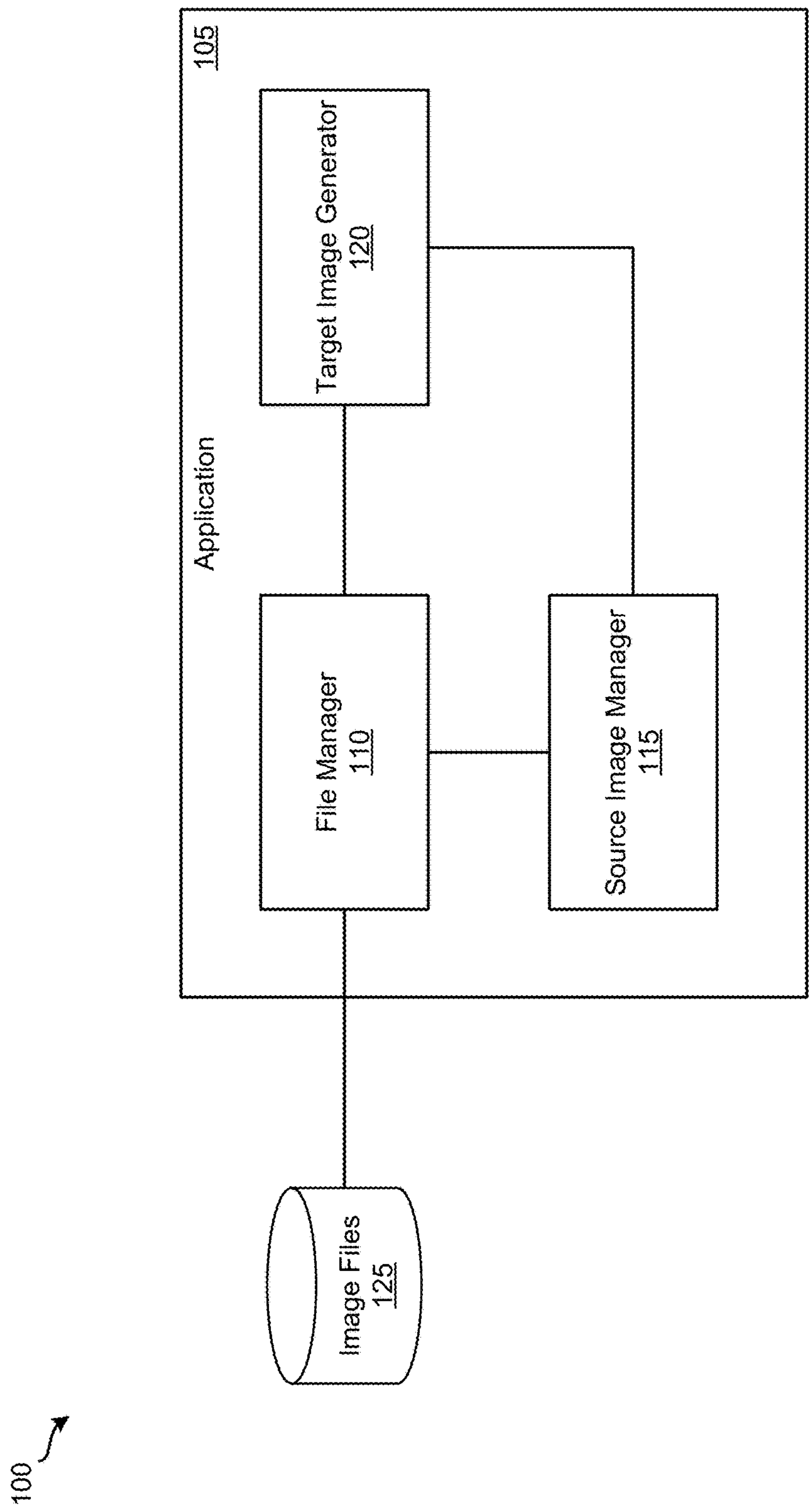
FIG. 1 illustrates a system for managing zoomable digital images according to some embodiments.
Figure 2:
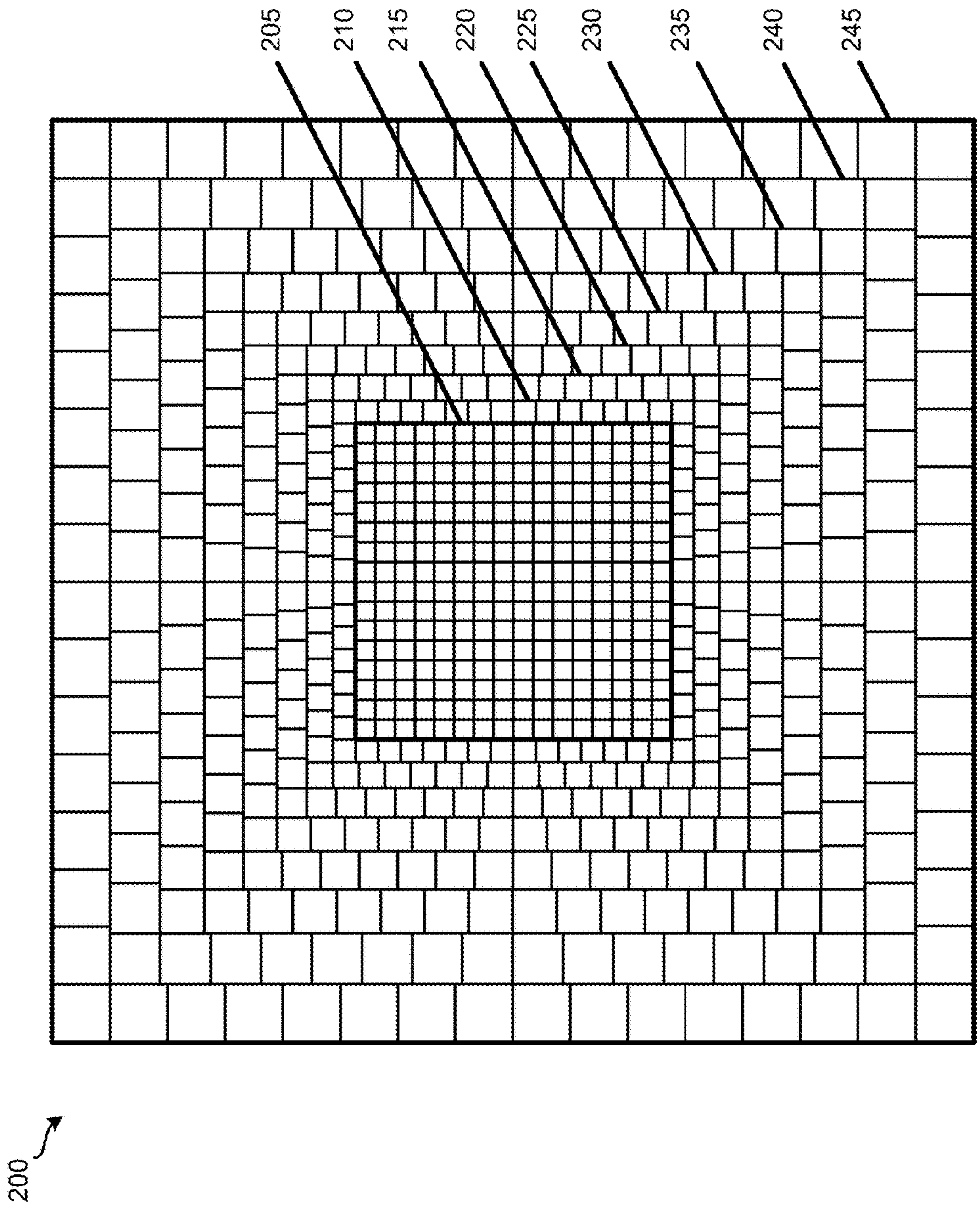
FIG. 2 illustrates a representation of a source image according to some embodiments.

FIG. 1 illustrates a system 100 for managing zoomable digital images according to some embodiments. A zoomable digital image may also be referred to as a source image. FIG. 2 illustrates a representation of a source image 200 according to some embodiments. As shown, source image 200 includes an interior image 205 and eight exterior images 210-245. In some embodiments, an interior image of the source image is an N×N image having N rows of pixels and N columns of pixels. In this example, interior image 205 is a 16×16 image having 16 rows of pixels and 16 columns of pixels.

In some embodiments, an exterior image is a set of pixels that are configured to encompass an interior image. The number of horizontal and vertical pixels of the exterior image matches the dimensions of the interior image. That is, the exterior image has N number of vertical pixels on the left and right of the interior image and N number of horizontal pixels encompassing on the top and bottom of the interior image. As illustrated in FIG. 2, for this example, each of the exterior images 210-245 has 16 vertical pixels on the left of interior image 205, 16 vertical pixels on the right of interior image 205, 16 horizontal pixels on the top of interior image 205, and 16 horizontal pixels on the bottom of interior image 205.

In some embodiments, the size of the set of pixels of an exterior image is greater than the size of the pixels in the interior image and any other exterior images encompassed by the set of pixels. As illustrated in FIG. 2, in this example, exterior image 210 encompasses interior image 205 and the size of the pixels of exterior image 210 are larger than the size of the pixels of interior image 205. Exterior image 215 encompasses exterior image 210 and the size of the pixels of exterior image 215 are larger than the size of the pixels of interior image 205 and exterior image 210. Exterior image 220 encompasses exterior image 215 and the size of the pixels of exterior image 220 are larger than the size of the pixels of interior image 205 and exterior images 210 and 215. Exterior image 225 encompasses exterior image 220 and the size of the pixels of exterior image 225 are larger than the size of the pixels of interior image 205 and exterior images 210-220. Exterior image 230 encompasses exterior image 225 and the size of the pixels of exterior image 230 are larger than the size of the pixels of interior image 205 and exterior images 210-225. Exterior image 235 encompasses exterior image 230 and the size of the pixels of exterior image 235 are larger than the size of the pixels of interior image 205 and exterior images 210-230. Exterior image 240 encompasses exterior image 235 and the size of the pixels of exterior image 240 are larger than the size of the pixels of interior image 205 and exterior images 210-235. Lastly, exterior image 245 encompasses exterior image 240 and the size of the pixels of exterior image 245 are larger than the size of the pixels of interior image 205 and exterior images 210-240.

The interior image as well as each exterior image of a source image can be associated with a zoom level. For this example, source image 200 has nine levels of zoom: interior image 205 is associated with a zoom level of eight, exterior image 210 is associated with a zoom level of seven, exterior image 215 is associated with a zoom level of six, exterior image 220 is associated with a zoom level of five, exterior image 225 is associated with a zoom level of four, exterior image 230 is associated with a zoom level of three, exterior image 235 is associated with a zoom level of two, exterior image 240 is associated with a zoom level of one, and exterior image 245 is associated with a zoom level of zero.

Returning to FIG. 1, system 100 includes application 100 and image files storage 125. Image files storage 125 is configured to store files of source images (e.g., source image 200). Image files storage 125 may be one or more relational databases, non-relational databases (e.g., document-oriented databases, key-value databases, column-oriented databases, non structured query language (NoSQL) databases, etc.), or a combination thereof. In some embodiments, image files storage 125 is implemented in a single physical storage while, in other embodiments, image files storage 125 may be implemented across several physical storages. While FIG. 1 shows image files storage 125 as external to application 100, one of ordinary skill in the art will appreciated that image files storage 125 may be part of application 100 in some embodiments. In other embodiments, image files storage 125 can be external to system 100.

As illustrated in FIG. 1, application 105 includes file manager 110, source image manager 115, and target image generator 120. File manager 110 is configured to manage files of source images. For instance, file manager 110 can be responsible for storing source images in image files storage 125. In some embodiments, file manager 110 stores a source image in a particular file format that includes a header, an interior image of the source image, and a set of exterior images of the source image. Table 1, provided below, illustrates an example header:

TABLE 1

| Type of value | Description | Size in bytes |
|---|---|---|
| Binary data 0x89 | Starting string | 1 |
| String 'ZBL' | Identification marker | 3 |
| Integer | Height/Width of interior image | 4 |
| Integer | Maximum level | 4 |
| Integer | MTop | 4 |
| Integer | MRight | 4 |
| Integer | MBottom | 4 |
| Integer | MLeft | 4 |
| Integer | Default level | 4 |
| String: 'JPEG', 'PNG', etc. | Image type | 4 |
| Integer | Offset of interior image | 4 |
| Integer | Size of interior image | 4 |
| Integer | Offset of exterior image | 4 |
| Integer | Size of exterior image | 4 |

As shown in Table 1, the header starts with a binary value of 0×89, which has the high bit set to in order to detect transmission systems that do not support 8-bit data and to reduce the chance that the source image is incorrectly interpreted as a text file is or vice versa. The next field in the header is an identification marker (e.g., "ZBL" in this example) for identifying the file type of the source image. The next field is the value of width/height of the interior image of the source image in terms of a number of pixels. Referring to FIG. 2 as an example, source image 200 has a height/width of 16 pixels. The next field in the header is the maximum zoom level of the source image. Referring to FIG. 2 as an example, source image 200 has maximum level value of eight (source image has zoom levels from zero to eight, with nine zoom levels altogether). The next four fields in the header define the visible portion of the target image. The next field in the header is a default zoom level, which is the zoom level at which the source image is initially displayed. For example, some images are suitable for zooming in and, thus, the default zoom level may be set to a zoom level of zero. As another example, some images are suitable for zooming out and, thus, the default zoom value can be the maximum zoom level. The next field in the header specifies the format (e.g., a joint photographic experts group (JPEG) image format, a portable network graphics (PNG) image format, a tagged image file format (TIFF) image format, etc.) of the interior image and the exterior images in the file. The next two fields of the header specify an offset where the interior image data starts and the size of the interior image. The final two fields of the header specify an offset where the exterior images start and then the size of the exterior images.

Figure 3:
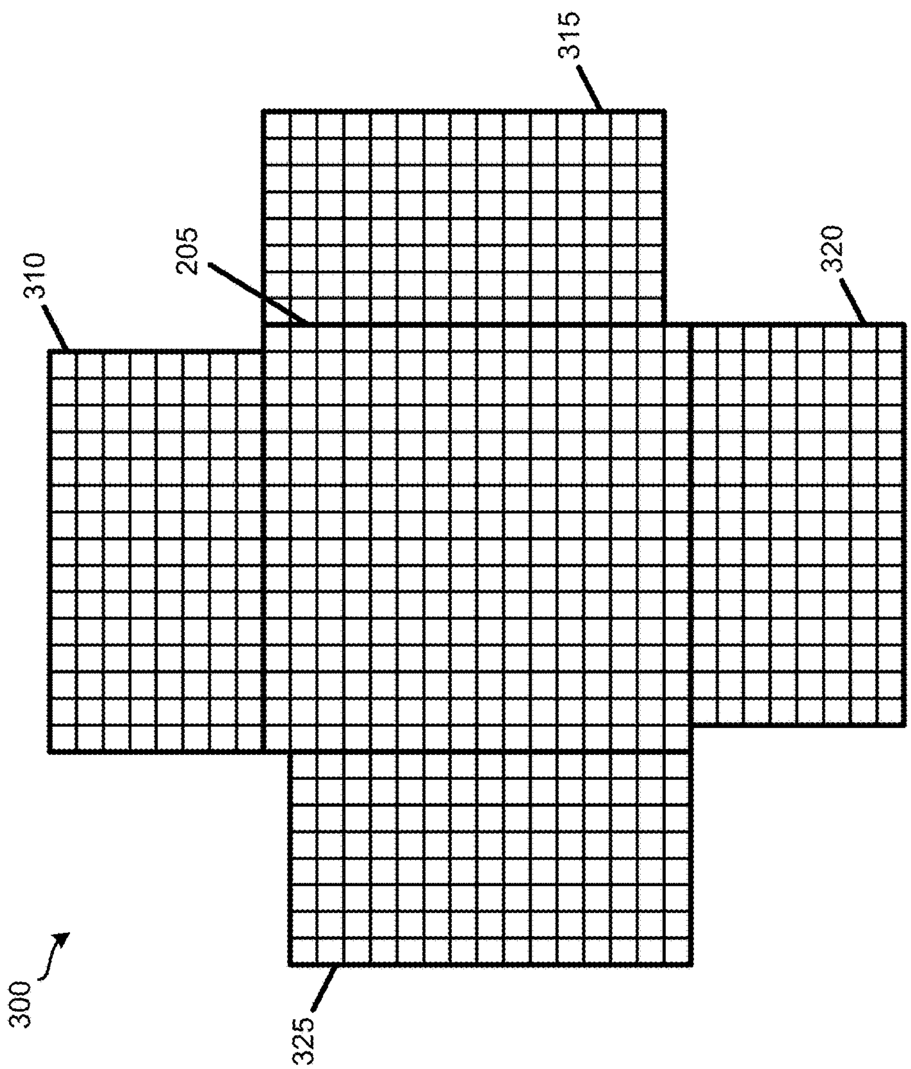
FIG. 3 illustrates a representation of a transformed source image according to some embodiments.

In some embodiments, before file manager 110 stores the exterior images of a source image in the file format described above, file manager 110 may transform the source image into a different source image. For example, file manager 110 may modify the size of the pixels of each of the exterior images to be the same size as the pixels of the interior image of the source image. FIG. 3 illustrates a representation of a transformed source image according to some embodiments. Specifically, FIG. 3 illustrates source image 300, which is a transformed source image of source image 200. As shown, source image 300 includes interior image 205 and four pixel groups 310-325. For this example, the size of the pixels in the pixel groups 310-325 is the same as the size of the pixels of interior image 205. Each of the pixel groups 310-325 includes a portion of the pixels of each of the exterior images 210-245. In particular, pixel group 310 includes the top pixels of exterior images 210-245 except for the right-most pixels. Pixel group 315 includes the right pixels of exterior images 210-245 except for the bottom-most pixels. Pixel group 320 includes the bottom pixels of exterior images 210-245 except for the left-most pixels. Finally, pixel group 325 includes the left pixels of exterior images 210-245 except for the top-most pixels.

Figure 4:
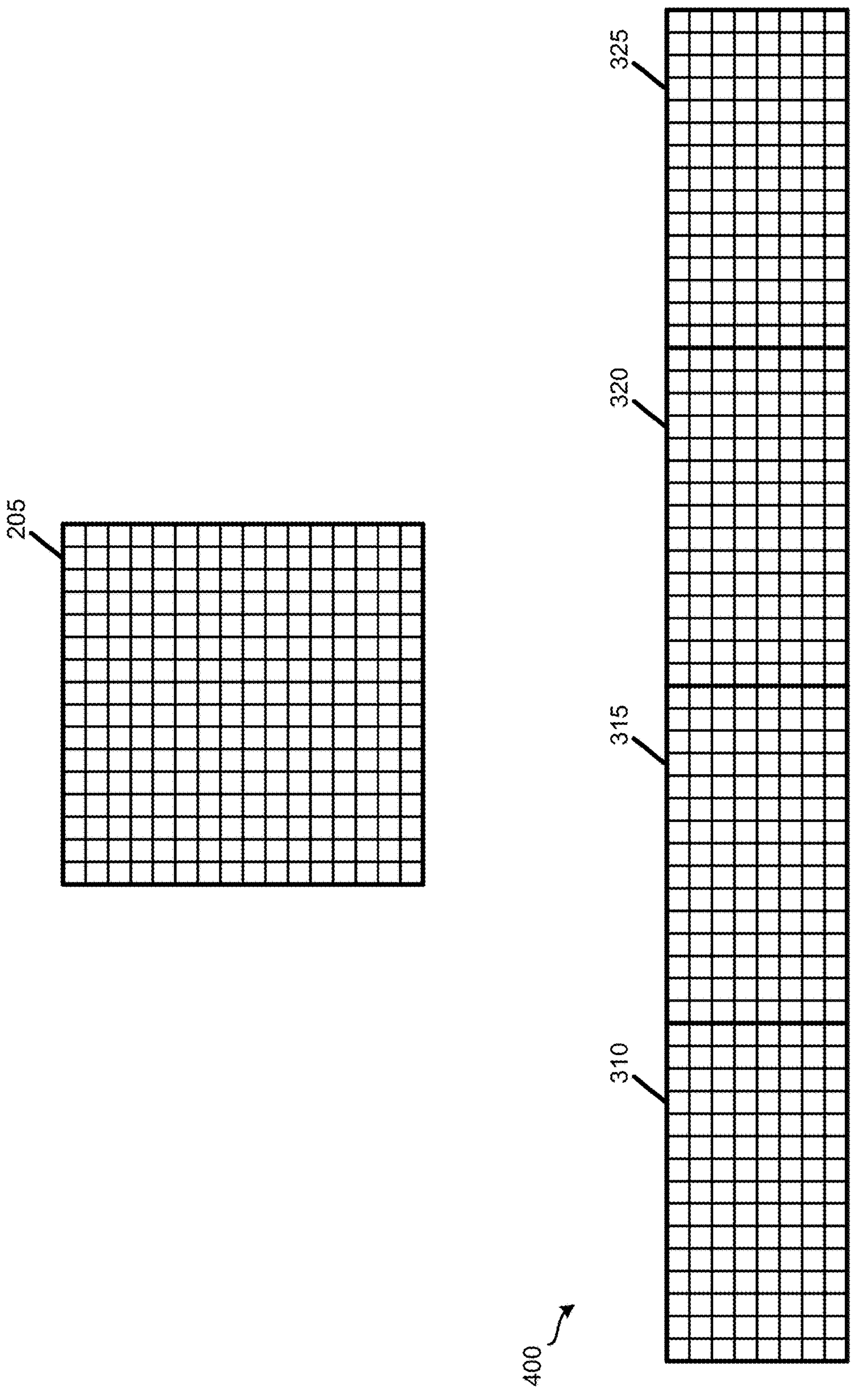
FIG. 4 illustrates an interior image and exterior images of a source image according to some embodiments.

Once file manager 110 creates a header for a source image and transforms the source image, file manager 110 stores the source image in a file by storing the interior image after the header of the file and then storing the exterior images after the interior image. In some embodiments, file manager 110 transforms the pixel groups of a source image into a contiguous image that is used for storage in the file. FIG. 4 illustrates an interior image and exterior images of a source image according to some embodiments. In particular, FIG. 4 illustrates interior image 205 and exterior images 400 in a form used for storage in a file of source image 300. Interior image 205 has a number of pixels equal to $C_i$*$C_i$ (256 pixels in this example), where $C_i$ is the height/width of interior image 205 in terms of pixels. As shown, exterior images 400 is a contiguous image that includes pixel groups 310-325. Exterior images 400 has a number of pixels equal to ($C_i$−1)*4*$C_e$ (480 pixels in this example), where $C_e$ is the number of exterior images in source image 300 (eight in this example). In this example, the orientation of pixel group 310 is maintained while pixel group 315 has been rotated 90 degrees counterclockwise, pixel group 320 has been rotated 180 degrees counterclockwise, and pixel group 325 has been rotated 270 degrees counterclockwise.

File manager 110 may be configured to read files of source images stored in the manner described above in response to requests that file manager 110 receives from target image generator 120. To read a file of a source image, file manager 110 loads the data of the interior image and the exterior images based on the information specified in the header and uses an image decoder (e.g., a JPEG decoder, a PNG decoder, a TIFF decoder, etc.) that corresponds to the image format specified in the header to decode the interior image and the exterior images. Then, file manager 110 generates the source image (e.g., source image 200) based on the interior image and the exterior image and then sends the source image to source image manager 115. Referring to FIG. 4 as an example, file manager 110 loads interior image 205 and exterior images 400, generates source image 300 based on interior image 205 and exterior image 400, and modifies the pixel size of pixel groups 310-325 in order to generate source image 200.

Figure 5:
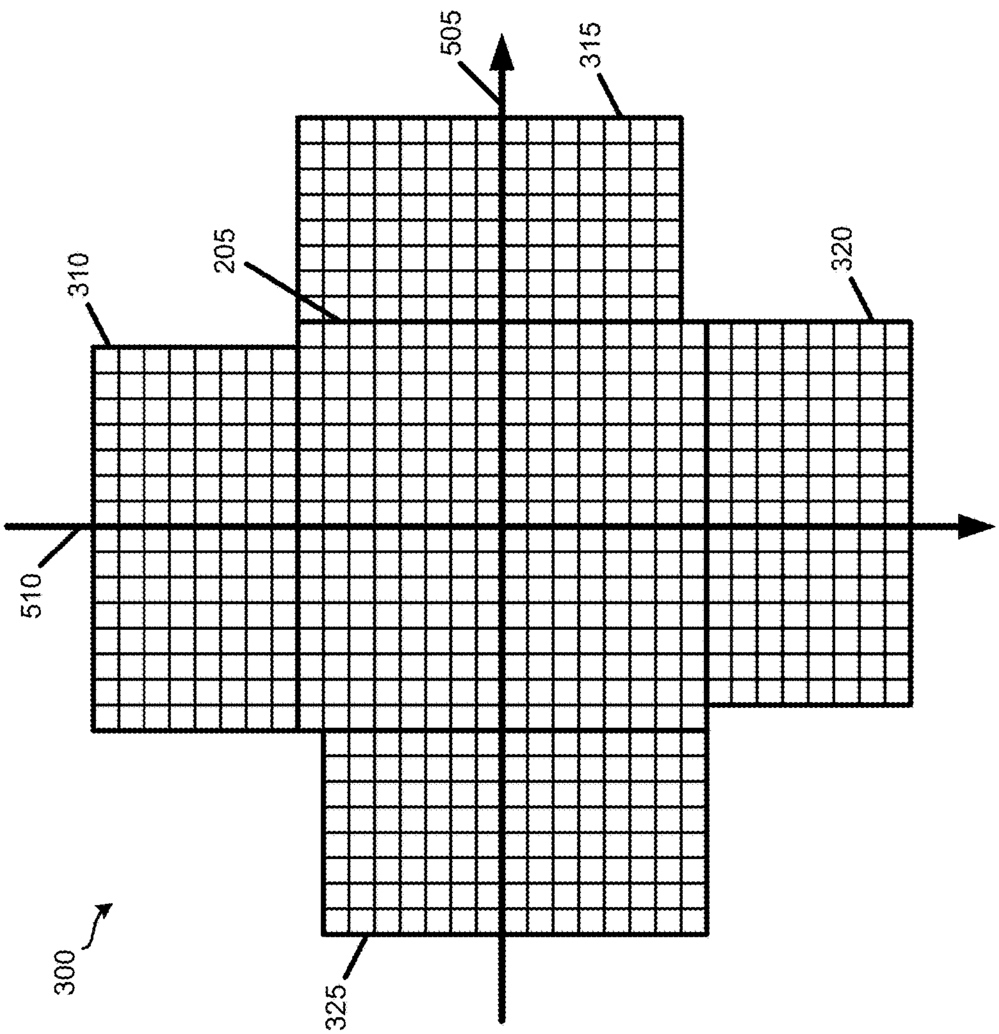
FIG. 5 illustrates a coordinate system of a source image according to some embodiments.

Source image manager 115 is responsible for managing source images generated by file manager 110. For example, source image manager 115 may determine locations and pixel sizes of pixels in a source image. In some embodiments, source image manager 115 employs a coordinate system in order to make such determinations. Source image manager 115 may use a coordinate system based on a transformed source image (e.g., source image 300) in which the size of all the pixels are the same. FIG. 5 illustrates a coordinate system of a source image according to some embodiments. Specifically, FIG. 5 illustrates a coordinate system for source image 300. As shown, the coordinate system is a coordinate system that includes an x-axis 505 and a y-axis 510. The size of a pixel is set as the unit of the coordinate system. In addition, the center of source image 300 is the origin of the coordinate system, values along x-axis 505 towards the right of the origin are increasingly positive, values along x-axis 505 towards the left of the origin are decreasingly negative, values along y-axis 510 above the origin are decreasingly negative, and values along y-axis 510 below of the origin are increasingly positive. In this coordinate system, the center of each pixel is defined as the index of the pixel. As such, when the height/width of interior image (referred to as $C_i$) is an odd, the coordinate values of pixels in the source image are integers (e.g., (0,1), (−2,4), etc.). When $C_i$ is even (like in this example source image 300), the coordinate values of pixels in the source image are decimals (e.g., (0.5,1.5), (−2.5,4.5), etc.).

For pixels in the interior image, the range of index values is from $(-(C_i-1)/2, -(C_i-1)/2)$ to $((C_i-1)/2, (C_i-1)/2)$. The range of index values of pixels in pixel group 310 is from $(-(C_i-1)/2, -(C_i-1)/2-C_e)$ to $((C_i-1)/2-1, -(C_i-1)/2-1)$ where $C_e$ is the number of exterior images in the source image (e.g., source image 200/300 has eight exterior images). The range of index values of pixels in pixel group 315 is from $((C_i-1)/2+1, -(C_i-1)/2)$ to $((C_i-1)/2+C_e, (C_i-1)/2-1)$. The range of index values of pixels in pixel group 320 is from $(-(C_i-1)/2+1, (C_i-1)/2+1)$ to $((C_i-1)/2, (C_i-1)/2+C_e)$. The range of index values of pixels in pixel group 325 is from $(-(C_i-1)/2-C_e, -(C_i-1)/2+1)$ to $(-(C_i-1)/2-1, (C_i-1)/2)$.

Once the index of a pixel in a source image is determined, source image manager 115 can determine the location of the pixel in the source image as well as the size of the pixel. To determine the location of a pixel in a source image, source image manager 115 determines the coordinate values of the center of the pixel. In some embodiments, for a pixel in an interior image of a source image with index values (X,Y), source image manager 115 determines the coordinate values of the center of the pixel as (X,Y) and the size of pixel is one.

For a pixel in the top portion of an exterior image of a source image with index values (X,Y), source image manager 115 determines the level of the pixel according to the following equation (1):

$$P_L=C_e-(-Y-(C_i-1)/2)$$

where $P_L$ is the level number. Source image manager 115 determines the size of the pixel in the top portion of the exterior image of the source image according to the following equation (2):

$$P_W=Pi^{(C_e-P_L)}$$

where $P_W$ is the size of the pixel and $R=C_i/(C_i-2)$. Referring to FIG. 2 as an example, W2 can be the size of a pixel in exterior image 245 and W2 can be the size of a pixel in exterior image 240. To determine the x-coordinate of a pixel in the top portion of an exterior image of a source image with index values (X,Y), source image manager 115 uses the following equation (3):

$$P_X=X\times P_W$$

wherein $P_X$ is the x-coordinate of the pixel. To determine the y-coordinate of a pixel in the top portion of an exterior image of a source image with index values (X,Y), source image manager 115 uses the following equation (4):

$$P_Y=-R^{(C_e-P_L)}\times\frac{C_i-1}{2}$$

where $P_Y$ is the y-coordinate of the pixel.

For a pixel in the right portion of an exterior image of a source image with index values (X,Y), source image manager 115 determines the level of the pixel according to the following equation (5):

$$P_L=C_e-(X-(C_i-1)/2)$$

where $P_L$ is the level number. Source image manager 115 determines the size of the pixel in the right portion of the exterior image of the source image using the equation (2) describe above with the $P_L$ value determined from equation (5). To determine the x-coordinate of a pixel in the right portion of an exterior image of a source image with index values (X,Y), source image manager 115 uses the following equation (6):

$$P_X=R^{(C_e-P_L)}\times\frac{C_i-1}{2}$$

wherein $P_X$ is the x-coordinate of the pixel. To determine the y-coordinate of a pixel in the right portion of an exterior image of a source image with index values (X,Y), source image manager 115 uses the following equation (7):

$$P_Y=Y\times P_W$$

where $P_Y$ is the y-coordinate of the pixel.

For a pixel in the bottom portion of an exterior image of a source image with index values (X,Y), source image manager 115 determines the level of the pixel according to the following equation (8):

$$P_L=C_e-(Y-(C_i-1)/2)$$

where $P_L$ is the level number. Source image manager 115 determines the size of the pixel in the bottom portion of the exterior image of the source image using the equation (2) provided above with the $P_L$ value determined from equation (8). To determine the x-coordinate of a pixel in the bottom portion of an exterior image of a source image with index values (X,Y), source image manager 115 uses the following equation (9):

$$P_X = X \times P_W$$

wherein $P_X$ is the x-coordinate of the pixel. To determine the y-coordinate of a pixel in the bottom portion of an exterior image of a source image with index values (X,Y), source image manager 115 uses the following equation (10):

$$P_Y = R^{(C_e - P_L)} \times \frac{C_i - 1}{2}$$

where $P_Y$ is the y-coordinate of the pixel.

For a pixel in the left portion of an exterior image of a source image with index values (X,Y), source image manager 115 determines the level of the pixel according to the following equation (11):

$$P_L = C_e - (-X - (C_i - 1)/2)$$

where $P_L$ is the level number. Source image manager 115 determines the size of the pixel in the left portion of the exterior image of the source image using the equation (2) describe above with the $P_L$ value determined from equation (11). To determine the x-coordinate of a pixel in the left portion of an exterior image of a source image with index values (X,Y), source image manager 115 uses the following equation (12):

$$P_X = -R^{(C_e - P_L)} \times \frac{C_i - 1}{2}$$

wherein $P_X$ is the x-coordinate of the pixel. To determine the y-coordinate of a pixel in the left portion of an exterior image of a source image with index values (X,Y), source image manager 115 uses the following equation (13):

$$P_Y = Y \times P_W$$

where $P_Y$ is the y-coordinate of the pixel.

In some instances where the source image includes a large number of zoom levels, generating pixels of a target image based on such a source image may consume a considerable amount of calculations and/or time. In some embodiments, source image manager 110 employs an image-splitting technique to handle the image processing in an efficient manner when the number of zoom levels of a source image is greater than a threshold amount. For example, when source image manager 115 receives a source image from file manager 110 and the number of zoom levels of the source image is greater than the threshold amount, source image manager 115 divides the exterior images of a source image into several groups and then generates several subimages based on the groups of exterior images and the interior image of the source image. Source image manage 110 may perform such operations when the number of zoom levels of the source image is greater than a threshold number of levels. In some embodiments, source image manager 115 divides the exterior images into groups of $C_{en}$ exterior images, where $C_{en}$ is a defined number of exterior images. In some embodiments, the value of $C_{en}$ is set at a particular value if the hardware used for image processing is powerful whereas the value of $C_{en}$ is set at a lower value if the hardware used for image processing is not powerful. That is, source image manager 115 divides the exterior images into n number of groups of exterior images, where n is the least integer greater than or equal to $(C_e/C_{en})$ as expressed by $n=\text{ceiling}(C_e/C_{en})$. As such, source image manager 115 generates n number of subimages. If $C_e/C_{en}$ is not an integer, then the last subimage has k number of exterior images, where $k=C_e-C_{en}*(n-1)$.

Figure 6:
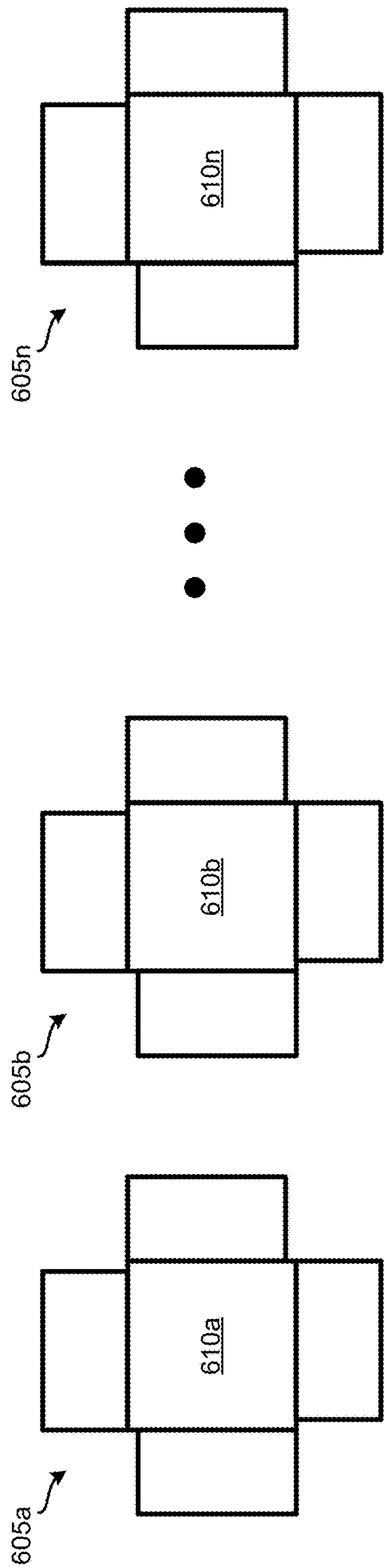
FIG. 6 illustrates subimages of a source image according to some embodiments.

FIG. 6 illustrates subimages of a source image according to some embodiments. In particular, FIG. 6 illustrates subimages 605*a-n*. Each of the subimages 605*a-n* includes an interior image 610 that has the same height/width in terms of pixels as the interior image of the source image. Referring to FIG. 2 as an example, if subimages 605*a-n* are subimages of source image 200, then interior images 610*a-n* would each have a height of 16 pixels and a width of 16 pixels. In this example, interior image 610*a* of subimage 605*a* is the interior image of the source image. Referring to FIG. 2 as an example, interior image 205 would be interior image 610*a*. In addition, the exterior images of subimage 605*a* include the exterior images associated with zoom level $(C_e-C_{en})$ to zoom level $(C_e-1)$. For subimage 605*b*, the interior image 610*b* is the target image of the entire subimage 605*a* and the exterior images of subimage 605*b* include the exterior images associated with zoom level $(C_e-C_{en}*2)$ to level $(C_e-C_{en}-1)$. For subimage 605*c*, the interior image 610*c* is the target image of the entire subimage 605*b* and the exterior images of subimage 605*c* include the exterior images associated with zoom level $(C_e-C_{en}*3)$ to level $(C_e-C_{en}*2-1)$. Subsequent subimages 605 are determined in a similar manner until subimage 605*n*. As such, for subimage 605*n*, the interior image 610*n* is the target image of the entire subimage 605(*n*−1) and the exterior images of subimage 605*n* include the exterior images associated with zoom level zero to level $(C_e-C_{en}*(n-1)-1)$.

In instances where source image manager 115 divides the exterior images of a source image into several groups and then generates several subimages, source image manager 115 may determine the subimage to use to generate a target image based on a given zoom level L that is greater than zero by using the following equation (14):

$$m = \text{floor}\left(\frac{C_e - L}{C_{en}} + 1\right)$$

where m is the subimage determined as the image source. When the given zoom level L is zero, source image manager 115 determines the subimage to use by using the following equation (15):

$$m = \text{ceiling}\left(\frac{C_e}{C_{en}}\right)$$

where m is the subimage determined as the image source. Once source image manager 115 determines the subimage, source image manager 115 then determines the zoom level of the subimage to use to generate a target image by using the following equation (16):

$$L_N = m \times C_{en} - (C_e - L)$$

where $L_N$ is the zoom level of the subimage.

Target image generator 120 is configured to generate target images based on source images managed by source image manager 115. For instance, target image generator 120 may receive a request from application 100 to generate a target image at a particular zoom level or zoom rate of a source image. In response, target image generator 120 sends file manager 110 a request to read the file of the source image. Target image generator 120 then receives information associated with the source image from source image manager 115, which target image generator 120 uses to generate a target image based on the source image.

In some embodiments, a target image that target image generator 120 generates has the same height/width in terms of pixels as the interior image of a source image. Referring to FIG. 2 as an example, target image generator 120 would generate a target image based on source image 200 that has a height of 16 pixels and a width of 16 pixels. To generate a target image at a particular zoom level of a source image, target image generator 120 determines the length of the pixels of the target image using the following equation (17):

$$P_W = R^{(C_e - L)}$$

where $P_W$ is the size of the pixel, $R = C_i/(C_i - 2)$, and L is the zoom level of the source image. Based on the determined pixel size, target image generator 120 generates a target image with Ci rows of pixels of size $P_W$ and Ci columns of pixels of size $P_W$. Thus, the target image has a height of $P_W * C_i$ and a width of $P_W * C_i$.

In some embodiments, target image generator 120 may determine a zoom level of a source image based on a zoom rate. Target image generator 120 may make such a determination by using the following equation (18):

$$L = \frac{\ln(Z)}{\ln(R)}$$

where Z is a zoom rate and L is the zoom level. When L is a decimal number, target image generator 120 rounds L to the closest integer.

Figure 7:
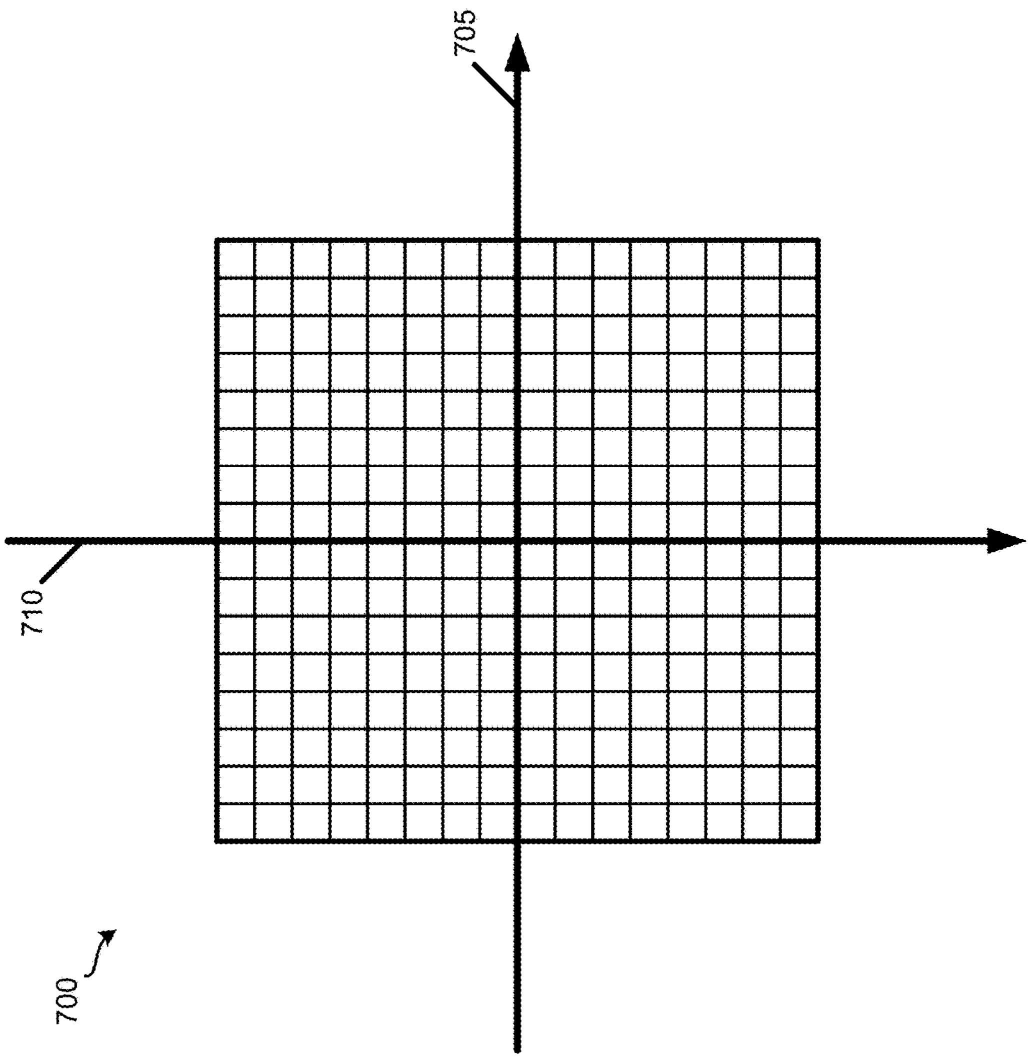
FIG. 7 illustrates a target image according to some embodiments.

FIG. 7 illustrates target image 700 according to some embodiments. In this example, target image 700 is generated based on source image 200. As such, target image 700 has 16 rows of pixels and 16 columns of pixels, which are the same as interior image 205 of source image 200. As shown, the coordinate system is a coordinate system that includes an x-axis 705 and a y-axis 710. The center of target image 700 is the origin of the coordinate system, values along x-axis 705 towards the right of the origin are increasingly positive, values along x-axis 705 towards the left of the origin are decreasingly negative, values along y-axis 710 above the origin are decreasingly negative, and values along y-axis 710 below of the origin are increasingly positive. In this coordinate system, the center of each pixel is defined as the index of the pixel. The index values of the pixels in target image 700 are set as the same as the index values of the pixels in interior image 205. As such, the range of index values for pixels in target image 700 is from (−(Ci−1)/2, −(Ci−1)/2) to ((Ci−1)/2, (Ci−1)/2), which is (−7.5, −7.5) to (7.5, 7.5) in this example. For a given pixel of target image 700 with index values (X,Y), the coordinate of the center of the pixel is $(X*P_W, Y*P_W)$, where $P_W$ is determined using the equation (17) described above.

Once target image generator 120 generates a target image at a particular zoom level of a source image, target image generator 120 overlays the target image on the source image in order to determine the colors of the pixels of the target image. Once the colors of the target image are determined, target image generator 120 generates the target image based on the determined colors and then application 100 may present the target image on a display of a device (e.g., a device on which application 100 is operating).

Figure 8A:
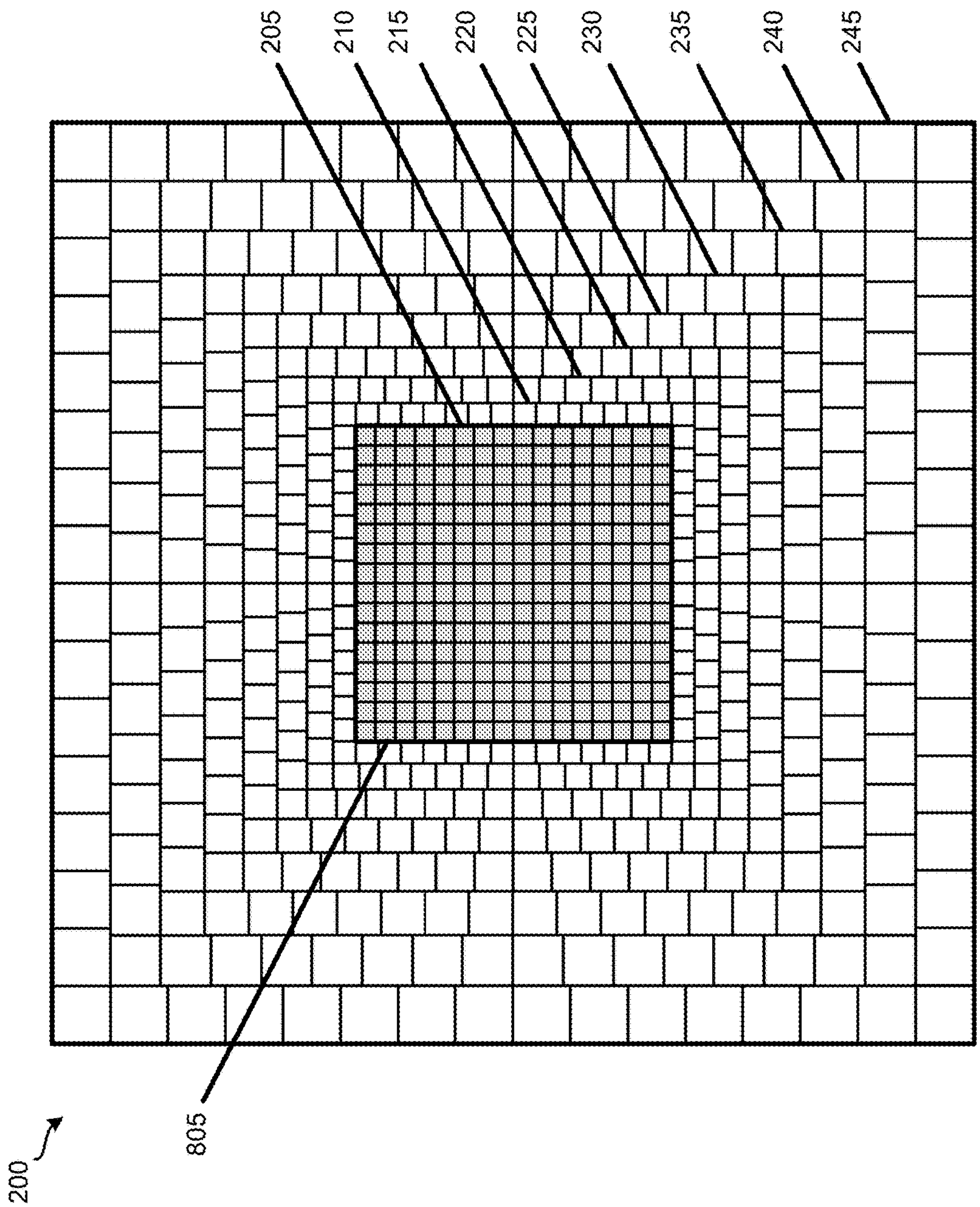
FIGS. 8A-8D illustrate example target images at different zoom levels of a source image according to some embodiments.
Figure 8B:
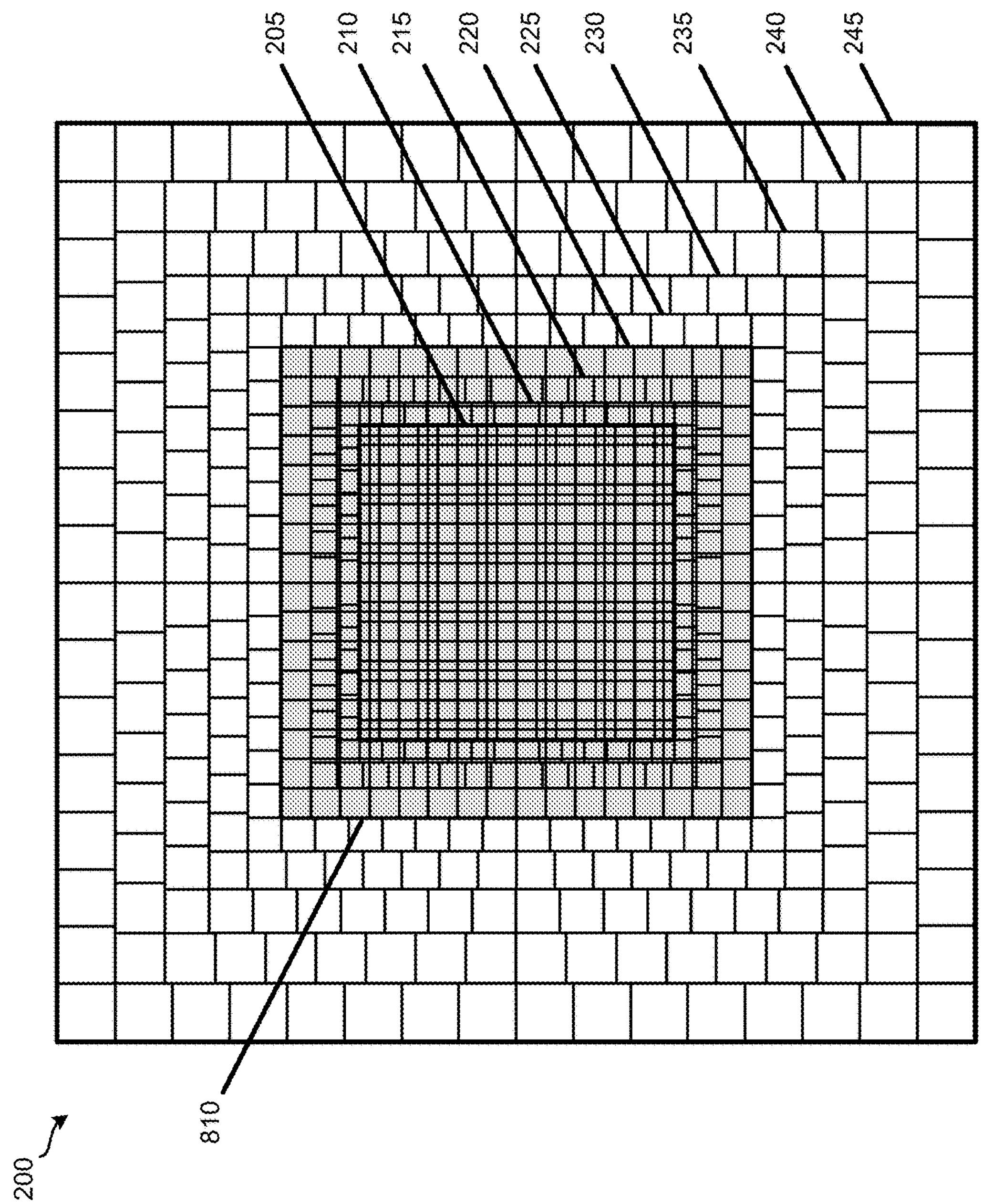
Figure 8C:
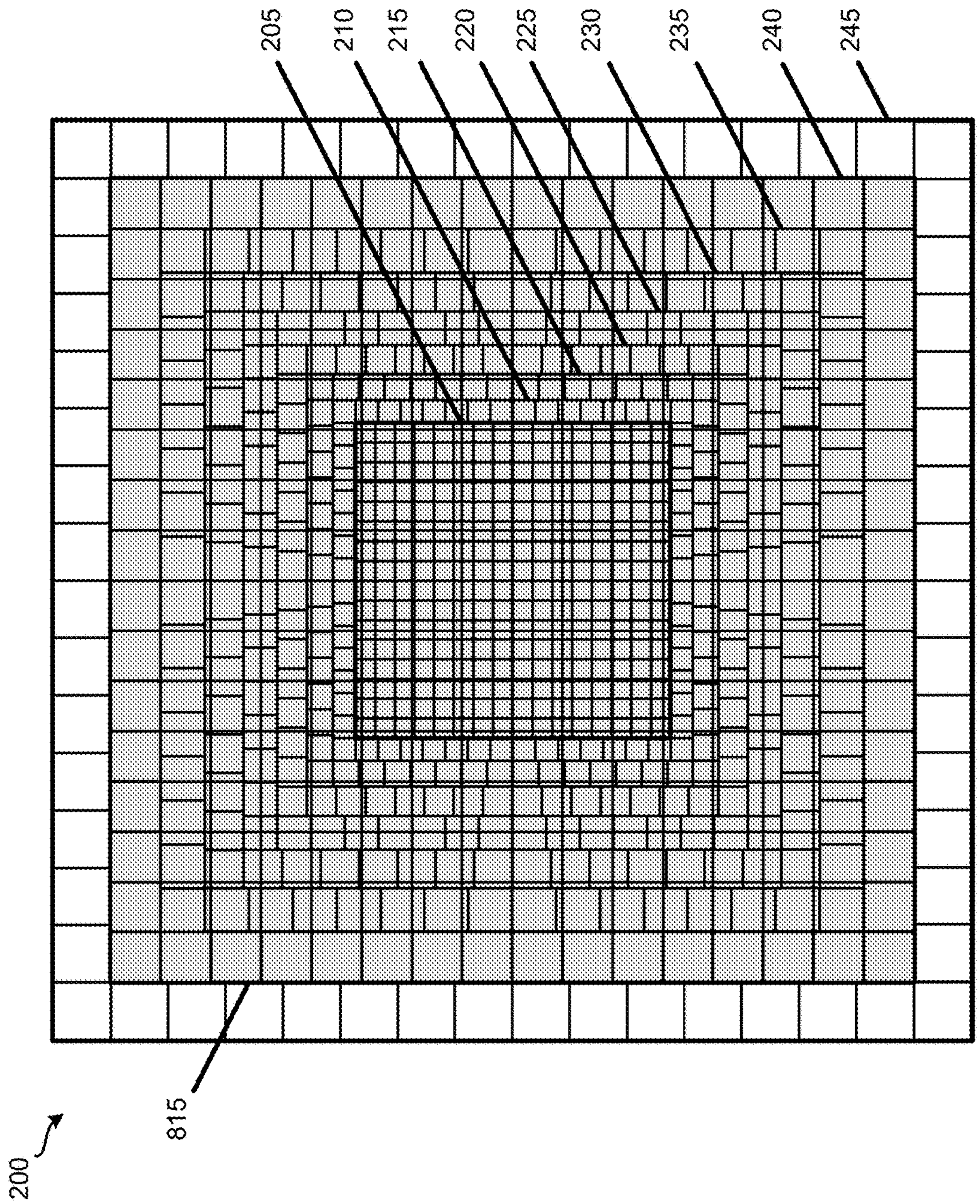
Figure 8D:
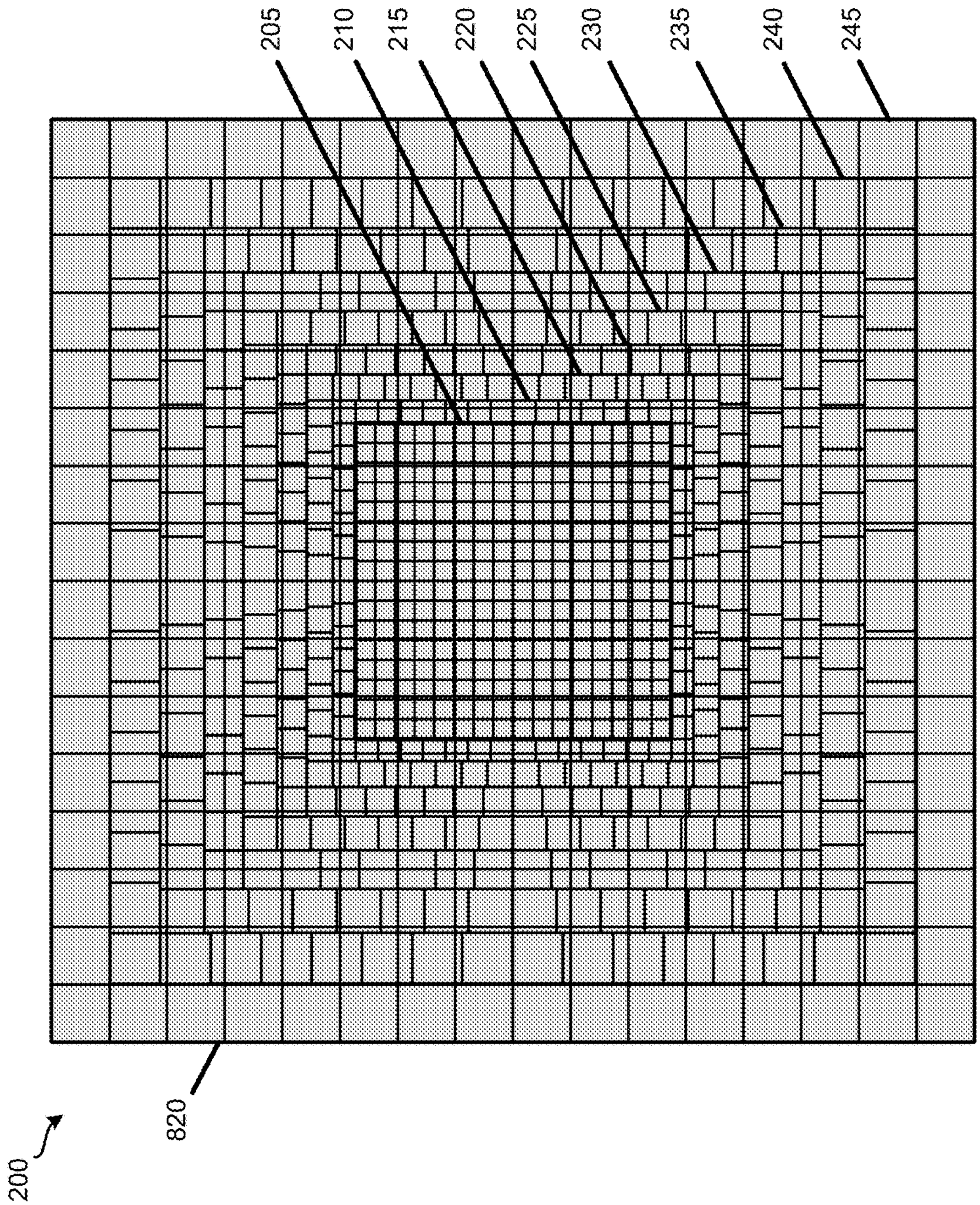

FIGS. 8A-8D illustrate example target images at different zoom levels of a source image according to some embodiments. Specifically, FIGS. 8A-8D illustrate example target images 805-820 at different zoom levels of source image 200. In these examples, target images 805-820 are represented by gray highlighting. FIG. 8A illustrates target image 805 at zoom level eight of source image 200. As shown, target image 805 overlays interior image 205 of source image 200. FIG. 8B illustrates target image 810 at zoom level five of source image 200. As illustrated, target image 810 overlays interior image 205 and exterior images 210-220 of source image 200. FIG. 8C illustrates target image 815 at zoom level one of source image 200. As shown, target image 815 overlays interior image 205 and exterior images 210-240 of source image 200. Finally, FIG. 8D illustrates target image 820 at zoom level zero of source image 200. As illustrated, target image 820 overlays the entire source image 200, which includes interior image 205 and exterior images 210-245.

To determine colors of pixels of a target image that is overlaid on a source image, target image generator 120 iterates through the pixels in the target image and determines colors for the pixels. For a pixel in the target image, target image generator 120 identifies pixels in the source image that are overlapped by the pixel in the target image and then determines the colors of the pixel in the target image based on the colors of the identified pixels in the source image. In some embodiments, the colors of each pixel in the target image and the source image are defined by three colors: red, green and blue (RGB). Target image generator 120 determines the red value for a pixel in the target image using the following equation (19):

$$P_R\sqrt{\frac{\sum_i^n (P_{Ri} \times P_{Ri} \times P_{Ai})}{P_A}}$$

where $P_R$ is the red value for the pixel in the target image, n is the number of pixels in the source image that are overlapped by the pixel in the target image, $P_{Ri}$ is the red value of the $i^{th}$ pixel in the source image that is overlapped by the pixel in the target image, $P_{Ai}$ is the portion of the area of the $i^{th}$ pixel in the source image that is overlapped by the pixel in the target image, and $P_A$ is the area of the pixel in the target image. Similarly, target image generator 120 determines the green value for a pixel in the target image using the following equation (20):

$$P_G\sqrt{\frac{\sum_i^n (P_{Gi} \times P_{Gi} \times P_{Ai})}{P_A}}$$

where $P_G$ is the green value for the pixel in the target image, n is the number of pixels in the source image that are overlapped by the pixel in the target image, $P_{Gi}$ is the green value of the $i^{th}$ pixel in the source image that is overlapped by the pixel in the target image, $P_{Ai}$ is the portion of the area of the $i^{th}$ pixel in the source image that is overlapped by the pixel in the target image, and $P_A$ is the area of the pixel in the target image. Lastly, target image generator 120 determines the blue value for a pixel in the target image using the following equation (21):

$$P_B\sqrt{\frac{\sum_i^n (P_{Bi}\times P_{Bi}\times P_{Ai})}{P_A}}$$

where $P_B$ is the blue value for the pixel in the target image, n is the number of pixels in the source image that are overlapped by the pixel in the target image, $P_{Bi}$ is the blue value of the $i^{th}$ pixel in the source image that is overlapped by the pixel in the target image, $P_{Ai}$ is the portion of the area of the $i^{th}$ pixel in the source image that is overlapped by the pixel in the target image, and $P_A$ is the area of the pixel in the target image.

Figure 9:
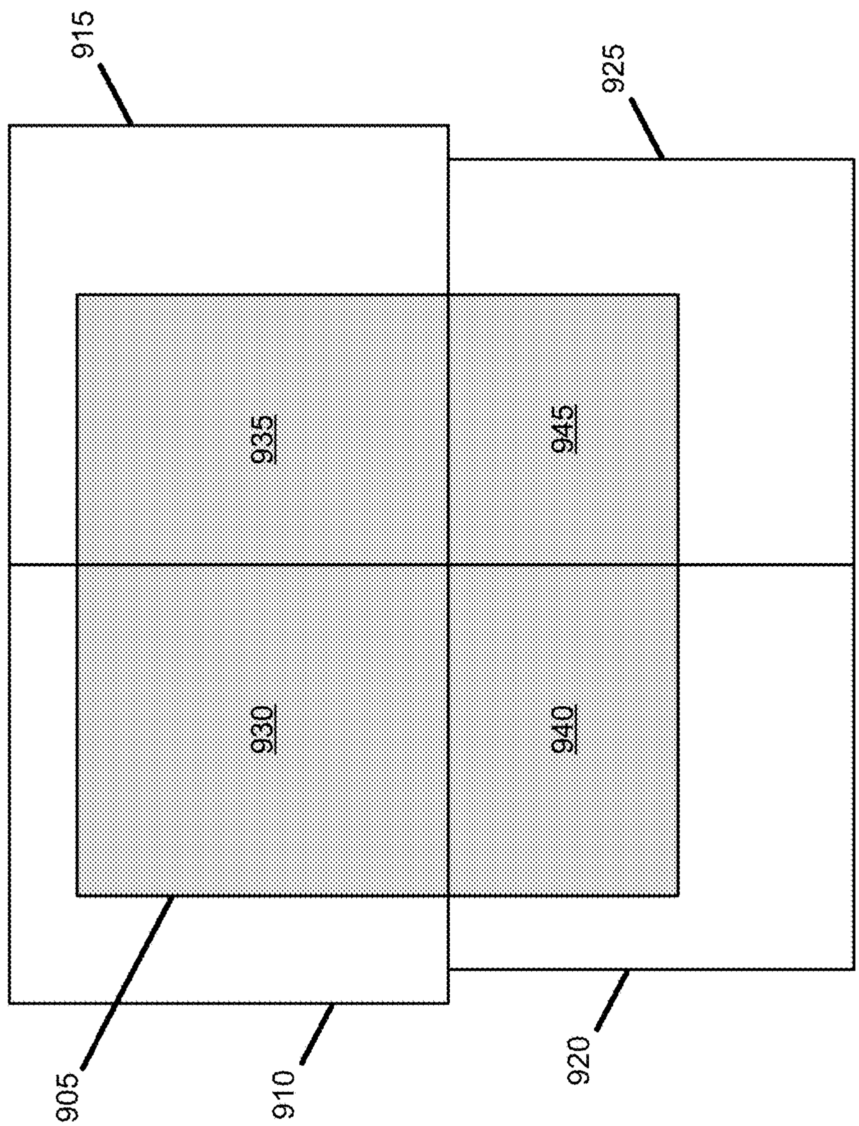
FIG. 9 illustrates a pixel of a target image and several pixels of a source image according to some embodiments.

FIG. 9 illustrates a pixel of a target image and several pixels of a source image according to some embodiments. In particular, FIG. 9 illustrates pixel 905 of a target image (e.g., target image 700) and four pixels 910-925 of a source image (e.g., source image 200) that are overlapped by pixel 905. In this example, target image generator 120 determines the red, green, and blue values for pixel 905 using equations (18)-(20), respectively, where n=4 and areas 930-945 are the portions of the areas of pixels 910-925, respectively, overlapped by pixel 905, $P_A$ is the area of pixel 905.

As mentioned above, a header of a file of a source image can specify four fields that define a visible portion of a target image. Specifically, the header fields MTop specifies the distance between the top of the visible portion and the top of the target image, MRight specifies the distance between the right of the visible portion and the right of the target image, MBottom specifies the distance between the bottom of the visible portion and the bottom of the target image, and MLeft specifies the distance between the left of the visible portion and the left of the target image. The unit of the visible portion may be the pixel size of the target image. In some embodiments, the value of at least one of the four fields is zero.

Figure 10:
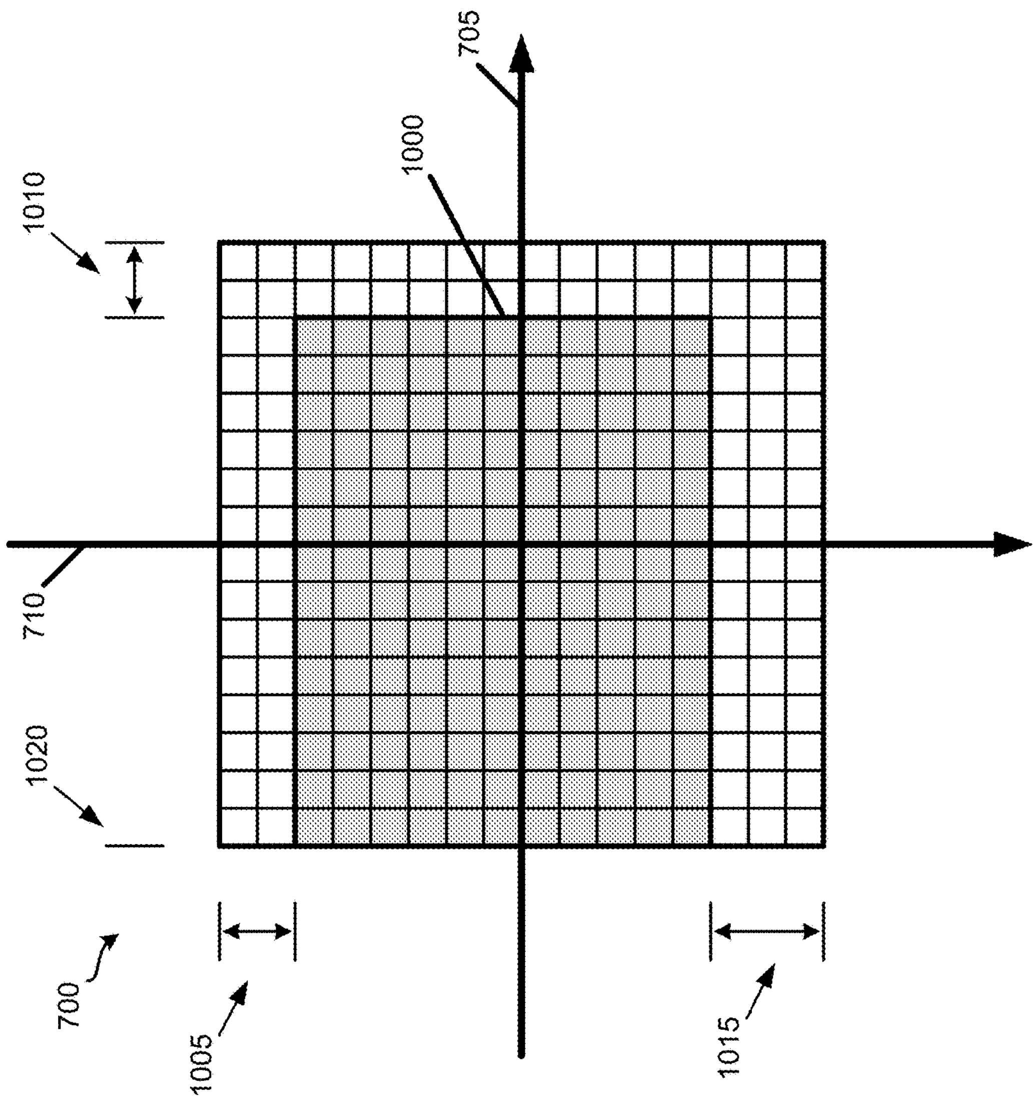
FIG. 10 illustrates a visible portion of a target image according to some embodiments.

FIG. 10 illustrates a visible portion of a target image according to some embodiments. In particular, FIG. 10 illustrates visible portion 1000 of target image 700. In this example, the MTop value for defining the top of visible portion 1000 is two, the MRight value for defining the right of visible portion 1000 is two, the MBottom value for defining the bottom of visible portion 1000 is three, and the MLeft value for defining the left of visible portion 1000 is zero.

In some embodiments, when a visible portion of a target image is specified in the header of a file of a source image, pixels in the source image that are overlapped by the visible portion of a target image generated at the lowest zoom level (e.g. zoom level zero) have image data. Pixels in the source image that are not overlapped by the visible portion of such a target image do not have image data. For example, in some embodiments, the color of the pixels in the source image that are not overlapped by the visible portion of the target image is defined as black. This way, when the source image is stored in a file in an image format, such as a JPEG image format or a PNG image format, the image data for pixels that are not overlapped by the visible portion of the target image are deeply compressed and use very little space.

Figure 11:
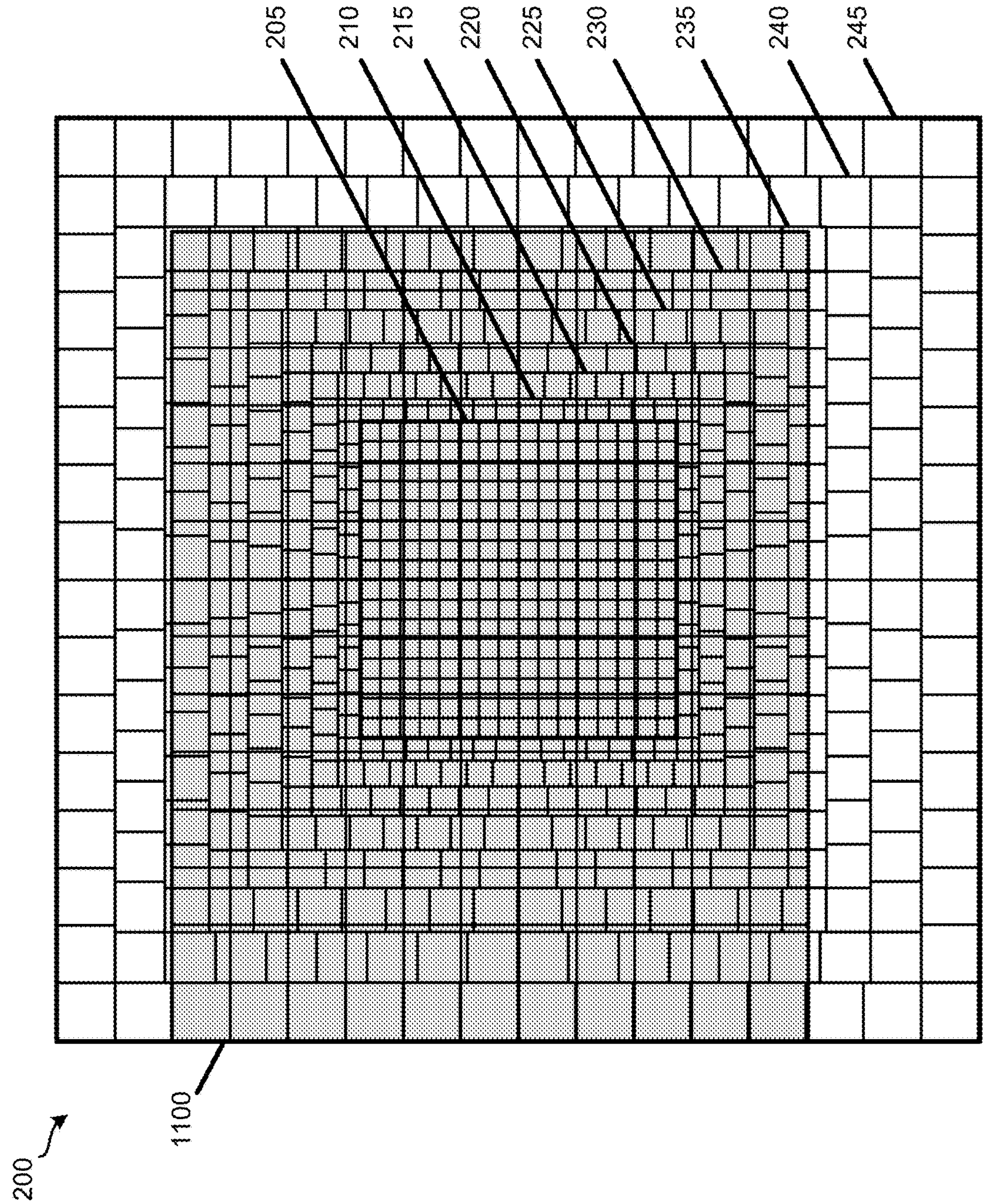
FIG. 11 illustrates an example of a source image and a visible portion of the source image according to some embodiments.

FIG. 11 illustrates an example of a source image and a visible portion of the source image according to some embodiments. Specifically, FIG. 11 illustrates source image 200 and visible portion 1100 of source image 200. In this example, visible portion 1100 is visible portion 1000 of target image 700 generated at the lowest zoom level of source image 200. As shown, the top two pixels and the bottom three pixels on the left side of exterior image 245, the pixels on the top of exterior image 245, the pixels on the right side of exterior image 245, and the pixels on the bottom of exterior image 245 are not overlapped by visible portion 1100. As such, these pixels do not have image data (e.g., the color of these pixels in source image 200 is defined as black). In addition, the bottom two pixels on the left side of exterior image 240, the pixels on the top of exterior image 240, the pixels on the right side of exterior image 240, and the pixels on the bottom of exterior image 240 are not overlapped by visible portion 1100. These pixels also do not have image data (e.g., the color of these pixels in source image 200 is defined as black). Lastly, the pixels on the bottom of exterior image 235 are not overlapped by visible portion 1100. Thus, these pixels do not have image data (e.g., the color of these pixels in source image 200 is defined as black). When source image 200 is stored in a file, the image data for the aforementioned pixels that are not overlapped by visible portion 1100 are deeply compressed and use very little space.

Returning to FIG. 1, when a visible portion of a target image is specified in the header of a file of a source image, target image generator 120 generates the defined visible portion of the target image and omits the remaining pixels in the target image when target image generator 120 generates the target image for presentation. The range of index values of pixels in a visible portion of a target image is from (−(Ci−1)/2+MLeft, −(Ci−1)/2+MTop) to ((Ci−1)/2−MRight, (Ci−1)/2−MBottom). Referring to FIG. 10 as an example, target image generator 120 would generate visible portion 1000 of target image 700 when target image generator 120 generates a target image for presentation. The range of index values of pixels in visible portion 1000 is from (−7.5, −5.5) to (5.5, 5.5).

Figure 12:
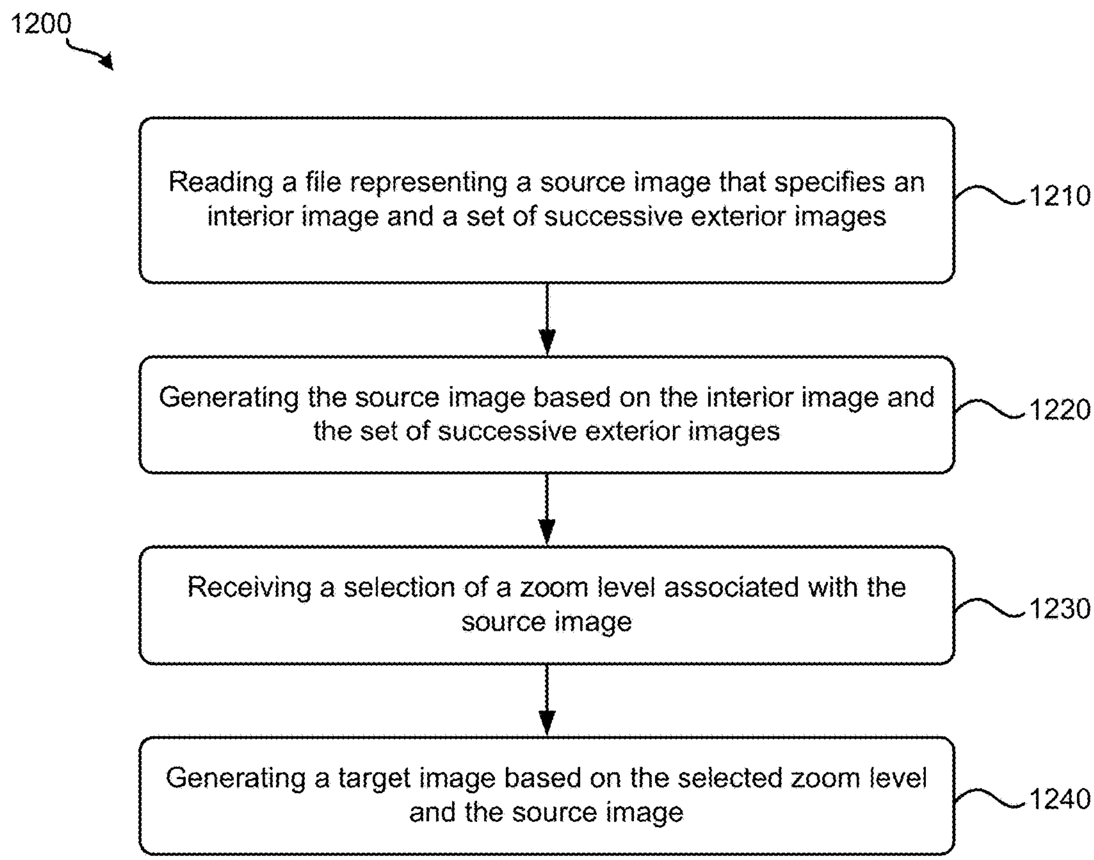
FIG. 12 illustrates a process for handling a request for a target image according to some embodiments.

FIG. 12 illustrates a process 1200 for handling a request for a target image according to some embodiments. In some embodiments, application 100 performs process 1200. Process 1200 starts by reading, at 1210, a file representing a source image that specifies an interior image and a set of successive exterior images. Referring to FIG. 1 as an example, file manager 110 may retrieve the file representing the source image from image files storage 125 and then read the file. Referring to FIG. 4 as an example, the file may store the set of successive exterior images as a single contiguous image like exterior images 400.

Next, process 1200 generates, at 1220, the source image based on the interior image and the set of successive exterior images. Referring to FIGS. 2 and 4, process 1200 may generate source image 200 from interior image 205 and exterior images 400. In some embodiments, process 1200 loads interior image 205 and exterior images 400, generates source image 300 based on interior image 205 and exterior image 400, and modifies the pixel size of pixel groups 310-325 in order to generate source image 200. Process 1200 then receives, at 1230, a selection of a zoom level associated with the source image.

Finally, process 1200 generates, at 1240, a target image based on the selected zoom level and the source image. Referring to FIGS. 8A-8D, process 1200 may generate target image 805 when the selected zoom level of source image 200 is eight, target image 810 when the selected zoom level of source image 200 is five, target image 815 when the selected zoom level of source image 200 is one, and target image 820 when the selected zoom level of source image 200 is zero.

Figure 13:
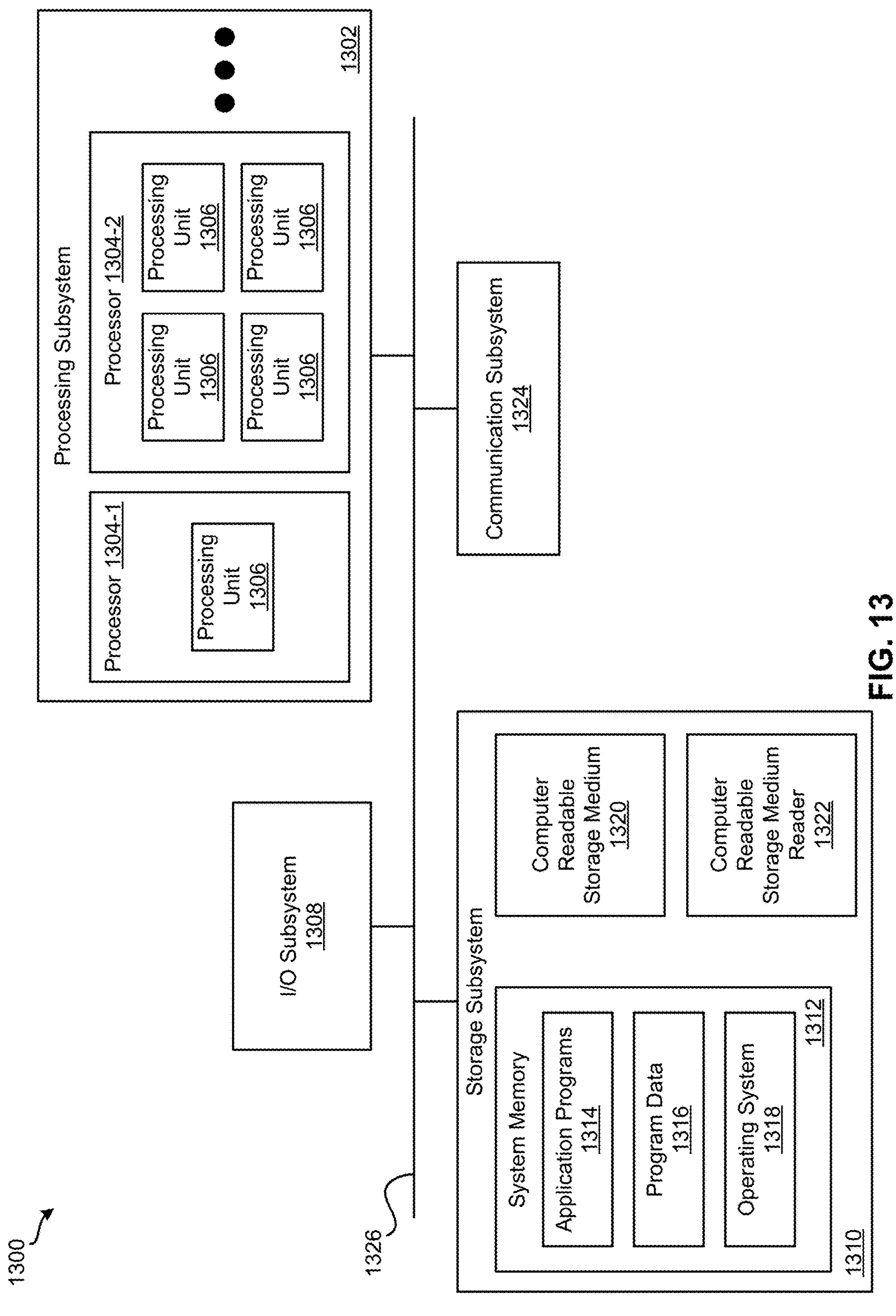
FIG. 13 illustrates an exemplary computer system, in which various embodiments may be implemented.

FIG. 13 illustrates an exemplary computer system 1300 for implementing various embodiments described above.

For example, computer system 1300 may be used to implement system 100. Computer system 1300 may be a desktop computer, a laptop, a server computer, or any other type of computer system or combination thereof. Some or all elements of application 105, file manager 110, source image manager 115, and target image generator 120, or combinations thereof can be included or implemented in computer system 1300. In addition, computer system 1300 can implement many of the operations, methods, and/or processes described above (e.g., process 1200). As shown in FIG. 13, computer system 1300 includes processing subsystem 1302, which communicates, via bus subsystem 1326, with input/output (I/O) subsystem 1308, storage subsystem 1310 and communication subsystem 1324.

Bus subsystem 1326 is configured to facilitate communication among the various components and subsystems of computer system 1300. While bus subsystem 1326 is illustrated in FIG. 13 as a single bus, one of ordinary skill in the art will understand that bus subsystem 1326 may be implemented as multiple buses. Bus subsystem 1326 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1302, which can be implemented as one or more integrated circuits (e.g., a conventional microprocessor or microcontroller), controls the operation of computer system 1300. Processing subsystem 1302 may include one or more processors 1304. Each processor 1304 may include one processing unit 1306 (e.g., a single core processor such as processor 1304-1) or several processing units 1306 (e.g., a multicore processor such as processor 1304-2). In some embodiments, processors 1304 of processing subsystem 1302 may be implemented as independent processors while, in other embodiments, processors 1304 of processing subsystem 1302 may be implemented as multiple processors integrate into a single chip or multiple chips. Still, in some embodiments, processors 1304 of processing subsystem 1302 may be implemented as a combination of independent processors and multiple processors integrated into a single chip or multiple chips.

In some embodiments, processing subsystem 1302 can execute a variety of programs or processes in response to program code and can maintain multiple concurrently executing programs or processes. At any given time, some or all of the program code to be executed can reside in processing subsystem 1302 and/or in storage subsystem 1310. Through suitable programming, processing subsystem 1302 can provide various functionalities, such as the functionalities described above by reference to process 1200, etc.

I/O subsystem 1308 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1300 to a user or another device (e.g., a printer).

As illustrated in FIG. 13, storage subsystem 1310 includes system memory 1312, computer-readable storage medium 1320, and computer-readable storage medium reader 1322. System memory 1312 may be configured to store software in the form of program instructions that are loadable and executable by processing subsystem 1302 as well as data generated during the execution of program instructions. In some embodiments, system memory 1312 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1312 may include different types of memory, such as static random access memory (SRAM) and/or dynamic random access memory (DRAM). System memory 1312 may include a basic input/output system (BIOS), in some embodiments, that is configured to store basic routines to facilitate transferring information between elements within computer system 1300 (e.g., during start-up). Such a BIOS may be stored in ROM (e.g., a ROM chip), flash memory, or any other type of memory that may be configured to store the BIOS.

As shown in FIG. 13, system memory 1312 includes application programs 1314 (e.g., application 105), program data 1316, and operating system (OS) 1318. OS 1318 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1320 may be a non-transitory computer-readable medium configured to store software (e.g., programs, code modules, data constructs, instructions, etc.). Many of the components (e.g., application 105, file manager 110, source image manager 115, and target image generator 120) and/or processes (e.g., process 1200) described above may be implemented as software that when executed by a processor or processing unit (e.g., a processor or processing unit of processing subsystem 1302) performs the operations of such components and/or processes. Storage subsystem 1310 may also store data used for, or generated during, the execution of the software.

Storage subsystem 1310 may also include computer-readable storage medium reader 1322 that is configured to communicate with computer-readable storage medium 1320. Together and, optionally, in combination with system memory 1312, computer-readable storage medium 1320 may comprehensively represent remote, local, fixed, and/or removable storage devices plus storage media for temporarily and/or more permanently containing, storing, transmitting, and retrieving computer-readable information.

Computer-readable storage medium 1320 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1324 serves as an interface for receiving data from, and transmitting data to, other devices, computer systems, and networks. For example, communication subsystem 1324 may allow computer system 1300 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1324 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1324 may provide components configured for wired communication (e.g., Ethernet) in addition to or instead of components configured for wireless communication.

One of ordinary skill in the art will realize that the architecture shown in FIG. 13 is only an example architecture of computer system 1300, and that computer system 1300 may have additional or fewer components than shown, or a different configuration of components. The various components shown in FIG. 13 may be implemented in hardware, software, firmware or any combination thereof, including one or more signal processing and/or application specific integrated circuits.

Figure 14:
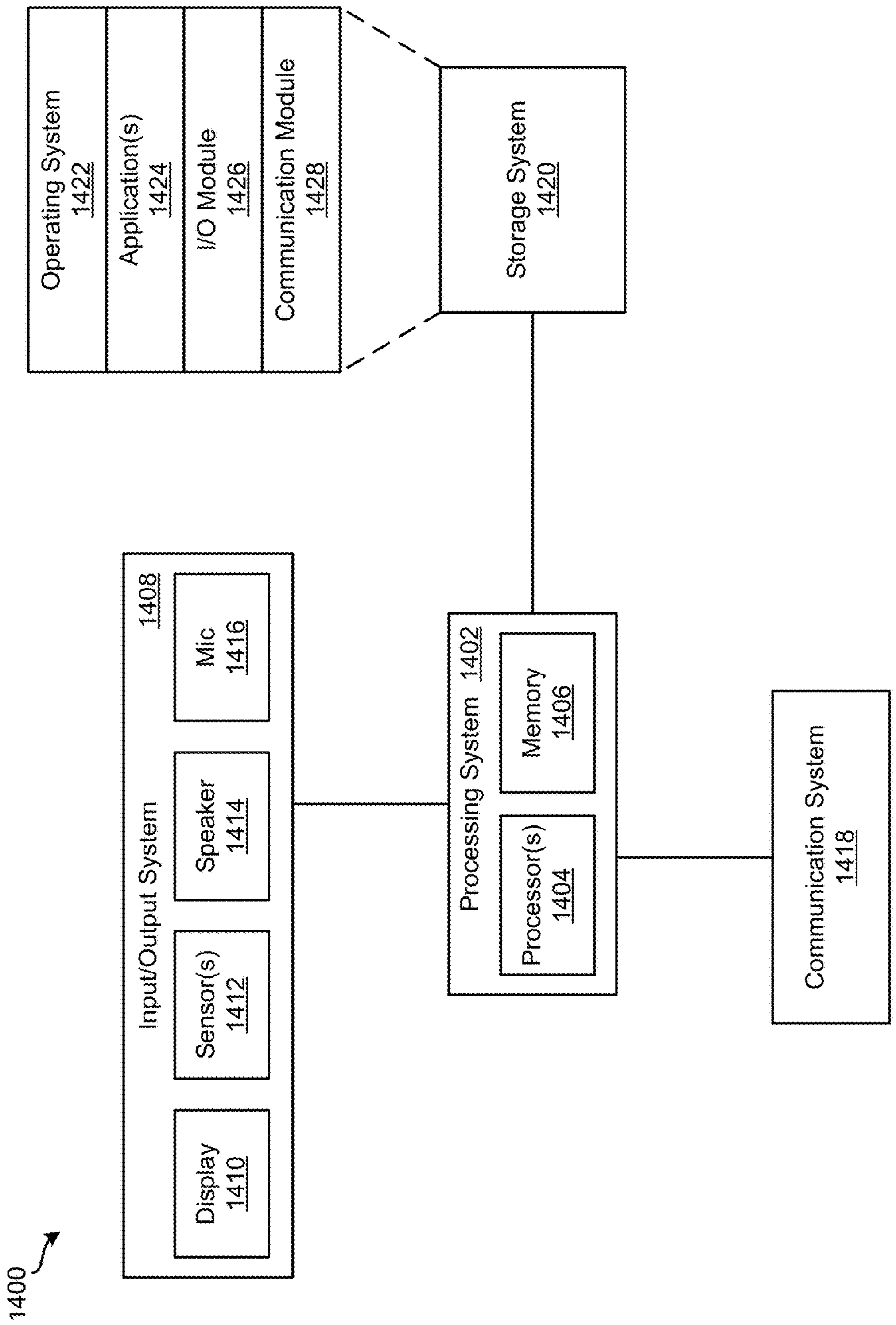
FIG. 14 illustrates an exemplary computing device, in which various embodiments may be implemented.

FIG. 14 illustrates an exemplary computing device 1400 for implementing various embodiments described above. For example, computing device 1400 may be used to implement system 100. Computing device 1400 may be a cellphone, a smartphone, a wearable device, an activity tracker or manager, a tablet, a personal digital assistant (PDA), a media player, or any other type of mobile computing device or combination thereof. Some or all elements of application 105, file manager 110, source image manager 115, and target image generator 120, or combinations thereof can be included or implemented in computing device 1400. In addition, computing device 1400 can implement many of the operations, methods, and/or processes described above (e.g., process 1200). As shown in FIG. 14, computing device 1400 includes processing system 1402, input/output (I/O) system 1408, communication system 1418, and storage system 1420. These components may be coupled by one or more communication buses or signal lines.

Processing system 1402, which can be implemented as one or more integrated circuits (e.g., a conventional microprocessor or microcontroller), controls the operation of computing device 1400. As shown, processing system 1402 includes one or more processors 1404 and memory 1406. Processors 1404 are configured to run or execute various software and/or sets of instructions stored in memory 1406 to perform various functions for computing device 1400 and to process data.

Each processor of processors 1404 may include one processing unit (e.g., a single core processor) or several processing units (e.g., a multicore processor). In some embodiments, processors 1404 of processing system 1402 may be implemented as independent processors while, in other embodiments, processors 1404 of processing system 1402 may be implemented as multiple processors integrate into a single chip. Still, in some embodiments, processors 1404 of processing system 1402 may be implemented as a combination of independent processors and multiple processors integrated into a single chip.

Memory 1406 may be configured to receive and store software (e.g., operating system 1422, applications 1424, I/O module 1426, communication module 1428, etc. from storage system 1420) in the form of program instructions that are loadable and executable by processors 1404 as well as data generated during the execution of program instructions. In some embodiments, memory 1406 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1408 is responsible for receiving input through various components and providing output through various components. As shown for this example, I/O system 1408 includes display 1410, one or more sensors 1412, speaker 1414, and microphone 1416. Display 1410 is configured to output visual information (e.g., a graphical user interface (GUI) generated and/or rendered by processors 1404). In some embodiments, display 1410 is a touch screen that is configured to also receive touch-based input. Display 1410 may be implemented using liquid crystal display (LCD) technology, light-emitting diode (LED) technology, organic LED (OLED) technology, organic electro luminescence (OEL) technology, or any other type of display technologies. Sensors 1412 may include any number of different types of sensors for measuring a physical quantity (e.g., temperature, force, pressure, acceleration, orientation, light, radiation, etc.). Speaker 1414 is configured to output audio information and microphone 1416 is configured to receive audio input. One of ordinary skill in the art will appreciate that I/O system 1408 may include any number of additional, fewer, and/or different components. For instance, I/O system 1408 may include a keypad or keyboard for receiving input, a port for transmitting data, receiving data and/or power, and/or communicating with another device or component, an image capture component for capturing photos and/or videos, etc.

Communication system 1418 serves as an interface for receiving data from, and transmitting data to, other devices, computer systems, and networks. For example, communication system 1418 may allow computing device 1400 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1418 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1418 may provide components configured for wired communication (e.g., Ethernet) in addition to or instead of components configured for wireless communication.

Storage system 1420 handles the storage and management of data for computing device 1400. Storage system 1420 may be implemented by one or more non-transitory machine-readable mediums that are configured to store software (e.g., programs, code modules, data constructs, instructions, etc.) and store data used for, or generated during, the execution of the software. Many of the components (e.g., application 105, file manager 110, source image manager 115, and target image generator 120) and/or processes (e.g., process 1200) described above may be implemented as software that when executed by a processor or processing unit (e.g., processors 1404 of processing system 1402) performs the operations of such components and/or processes.

In this example, storage system 1420 includes operating system 1422, one or more applications 1424, I/O module 1426, and communication module 1428. Operating system 1422 includes various procedures, sets of instructions, software components and/or drivers for controlling and managing general system tasks (e.g., memory management, storage device control, power management, etc.) and facilitates communication between various hardware and software components. Operating system 1422 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1424 can include any number of different applications installed on computing device 1400. For example, application 105 may be installed on computing device 1400. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1426 manages information received via input components (e.g., display 1410, sensors 1412, and microphone 1416) and information to be outputted via output components (e.g., display 1410 and speaker 1414). Communication module 1428 facilitates communication with other devices via communication system 1418 and includes various software components for handling data received from communication system 1418.

One of ordinary skill in the art will realize that the architecture shown in FIG. 14 is only an example architecture of computing device 1400, and that computing device 1400 may have additional or fewer components than shown, or a different configuration of components. The various components shown in FIG. 14 may be implemented in hardware, software, firmware or any combination thereof, including one or more signal processing and/or application specific integrated circuits.

Figure 15:
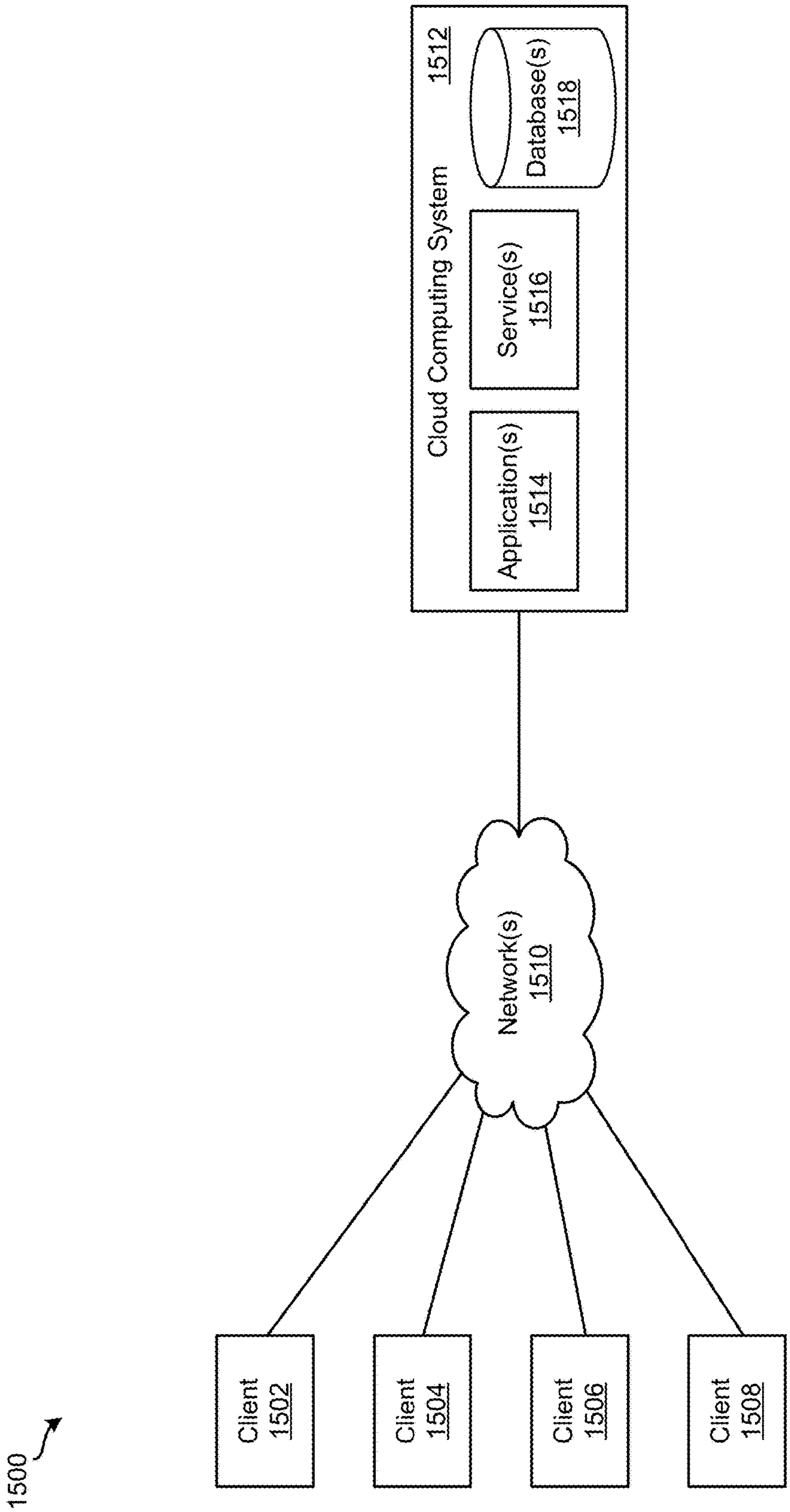
FIG. 15 illustrates system for implementing various embodiments described above.

FIG. 15 illustrates an exemplary system 1500 for implementing various embodiments described above. For example, cloud computing system 1512 of system 1500 may be used to implement system 100 and applications 1514 may be used to implement application 105. As shown, system 1500 includes client devices 1502-1508, one or more networks 1510, and cloud computing system 1512. Cloud computing system 1512 is configured to provide resources and data to client devices 1502-1508 via networks 1510. In some embodiments, cloud computing system 1500 provides resources to any number of different users (e.g., customers, tenants, organizations, etc.). Cloud computing system 1512 may be implemented by one or more computer systems (e.g., servers), virtual machines operating on a computer system, or a combination thereof.

As shown, cloud computing system 1512 includes one or more applications 1514, one or more services 1516, and one or more databases 1518. Cloud computing system 1500 may provide applications 1514, services 1516, and databases 1518 to any number of different customers in a self-service, subscription-based, elastically scalable, reliable, highly available, and secure manner.

In some embodiments, cloud computing system 1500 may be adapted to automatically provision, manage, and track a customer's subscriptions to services offered by cloud computing system 1500. Cloud computing system 1500 may provide cloud services via different deployment models. For example, cloud services may be provided under a public cloud model in which cloud computing system 1500 is owned by an organization selling cloud services and the cloud services are made available to the general public or different industry enterprises. As another example, cloud services may be provided under a private cloud model in which cloud computing system 1500 is operated solely for a single organization and may provide cloud services for one or more entities within the organization. The cloud services may also be provided under a community cloud model in which cloud computing system 1500 and the cloud services provided by cloud computing system 1500 are shared by several organizations in a related community. The cloud services may also be provided under a hybrid cloud model, which is a combination of two or more of the aforementioned different models.

In some instances, any one of applications 1514, services 1516, and databases 1518 made available to client devices 1502-1508 via networks 1510 from cloud computing system 1500 is referred to as a "cloud service." Typically, servers and systems that make up cloud computing system 1500 are different from the on-premises servers and systems of a customer. For example, cloud computing system 1500 may host an application and a user of one of client devices 1502-1508 may order and use the application via networks 1510.

Applications 1514 may include software applications that are configured to execute on cloud computing system 1512 (e.g., a computer system or a virtual machine operating on a computer system) and be accessed, controlled, managed, etc. via client devices 1502-1508. In some embodiments, applications 1514 may include server applications and/or mid-tier applications (e.g., HTTP (hypertext transport protocol) server applications, FTP (file transfer protocol) server applications, CGI (common gateway interface) server applications, JAVA server applications, etc.). Services 1516 are software components, modules, application, etc. that are configured to execute on cloud computing system 1512 and provide functionalities to client devices 1502-1508 via networks 1510. Services 1516 may be web-based services or on-demand cloud services.

Databases 1518 are configured to store and/or manage data that is accessed by applications 1514, services 1516, and/or client devices 1502-1508. For instance, image files storages 125 may be stored in databases 1518. Databases 1518 may reside on a non-transitory storage medium local to (and/or resident in) cloud computing system 1512, in a storage-area network (SAN), on a non-transitory storage medium local located remotely from cloud computing system 1512. In some embodiments, databases 1518 may include relational databases that are managed by a relational database management system (RDBMS). Databases 1518 may be a column-oriented databases, row-oriented databases, or a combination thereof. In some embodiments, some or all of databases 1518 are in-memory databases. That is, in some such embodiments, data for databases 1518 are stored and managed in memory (e.g., random access memory (RAM)).

Client devices 1502-1508 are configured to execute and operate a client application (e.g., a web browser, a proprietary client application, etc.) that communicates with applications 1514, services 1516, and/or databases 1518 via networks 1510. This way, client devices 1502-1508 may access the various functionalities provided by applications 1514, services 1516, and databases 1518 while applications 1514, services 1516, and databases 1518 are operating (e.g., hosted) on cloud computing system 1500. Client devices 1502-1508 may be computer system 1300 or computing device 1400, as described above by reference to FIGS. 13 and 14, respectively. Although system 1500 is shown with four client devices, any number of client devices may be supported.

Networks 1510 may be any type of network configured to facilitate data communications among client devices 1502-1508 and cloud computing system 1512 using any of a variety of network protocols. Networks 1510 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:

reading, from a file storage configured for storing files of source images in a particular file format, a file representing a source image, the file comprising a first image and a second image, the first image comprising a first plurality of pixels, the second image comprising a second plurality of pixels, each pixel in the first and second images having a same, particular size;

generating the source image by:

using the first image as an interior image of the source image, and generating a set of successive exterior images that corresponds to a set of successive zoom levels, each zoom level in the set of successive zoom levels successively larger than any prior zoom levels, each exterior image in the set of successive exterior images comprising a plurality of pixels from a portion of the second plurality of pixels of the second image configured to completely encompass the interior image and any prior exterior images, a size of each pixel in the plurality of pixels of each exterior image in the set of successive exterior images larger than the particular size and a size of the plurality of pixels of any prior exterior image, the size of each pixel in the plurality of pixels of each exterior image in the set of successive exterior images based on a factor of the size of a side of the interior image divided by the size of the side of the interior image minus two pixels;

receiving a selection of a zoom level in the set of successive zoom levels; and generating a target image based on the selected zoom level and the source image.

2. The non-transitory machine-readable medium of claim 1, wherein generating the target image comprises:

determining a subset of the set of successive exterior images based on the selected zoom level; and generating pixels of the target image based on the subset of the set of successive exterior images.

3. The non-transitory machine-readable medium of claim 1, wherein the program further comprises a set of instructions for displaying the target image on a display of the device.

4. The non-transitory machine-readable medium of claim 1, wherein generating the source image comprises:

dividing the set of successive exterior images into a plurality of groups of successive exterior images; and generating a plurality of subimages, each subimage in the plurality of subimages comprising an interior image and a subset of the plurality of groups of successive exterior images.

5. The non-transitory machine-readable medium of claim 4, wherein generating the target image comprises:

identifying the subset of the plurality of groups of successive exterior images corresponding to the selected zoom level; and generating the target image based on the identified subset of the plurality of groups of successive exterior images.

6. The non-transitory machine-readable medium of claim 1, wherein generating the target image comprises, for each pixel in the target image, determining colors of the pixel in the target image based on colors of pixels in the source image overlapped by the pixel in the target image.

7. The non-transitory machine-readable medium of claim 6, wherein determining, for each pixel in the target image, the colors of the pixel in the target image is further based on areas of portions of the pixels in the source image overlapped by the pixel in the target image.

8. A method, executable by a device, comprising:

reading, from a file storage configured for storing files of source images in a particular file format, a file representing a source image, the file comprising a first image and a second image, the first image comprising a first plurality of pixels, the second image comprising a second plurality of pixels, each pixel in the first and second images having a same, particular size;

generating the source image by:

using the first image as an interior image of the source image, and generating a set of successive exterior images that corresponds to a set of successive zoom levels, each zoom level in the set of successive zoom levels successively larger than any prior zoom levels, each exterior image in the set of successive exterior images comprising a plurality of pixels from a portion of the second plurality of pixels of the second image configured to completely encompass the interior image and any prior exterior images, a size of each pixel in the plurality of pixels of each exterior image in the set of successive exterior images larger than the particular size and a size of the plurality of pixels of any prior exterior image, the size of each pixel in the plurality of pixels of each exterior image in the set of successive exterior images based on a factor of the size of a side of the interior image divided by the size of the side of the interior image minus two pixels;

receiving a selection of a zoom level in the set of successive zoom levels; and generating a target image based on the selected zoom level and the source image.

9. The method of claim 8, wherein generating the target image comprises:

determining a subset of the set of successive exterior images based on the selected zoom level; and generating pixels of the target image based on the subset of the set of successive exterior images.

10. The method of claim 8 further comprising displaying the target image on a display of the device.

11. The method of claim 8, wherein generating the source image comprises:

dividing the set of successive exterior images into a plurality of groups of successive exterior images; and generating a plurality of subimages, each subimage in the plurality of subimages comprising an interior image and a subset of the plurality of groups of successive exterior images.

12. The method of claim 11, wherein generating the target image comprises:

identifying the subset of the plurality of groups of successive exterior images corresponding to the selected zoom level; and generating the target image based on the identified subset of the plurality of groups of successive exterior images.

13. The method of claim 8, wherein generating the target image comprises, for each pixel in the target image, determining colors of the pixel in the target image based on colors of pixels in the source image overlapped by the pixel in the target image.

14. The method of claim 13, wherein determining, for each pixel in the target image, the colors of the pixel in the target image is further based on areas of portions of the pixels in the source image overlapped by the pixel in the target image.

15. A system comprising:

a set of processing units; and a non-transitory computer-readable medium storing instructions that when executed by at least one processing unit in the set of processing units cause the at least one processing unit to:

read, from a file storage configured for storing files of source images in a particular file format, a file representing a source image, the file comprising a first image and a second image, the first image comprising a first plurality of pixels, the second image comprising a second plurality of pixels, each pixel in the interior image having a same, particular size;

generate the source image by:

using the first image as an interior image of the source image, and generating a set of successive exterior images that corresponds to a set of successive zoom levels, each zoom level in the set of successive zoom levels successively larger than any prior zoom levels, each exterior image in the set of successive exterior images comprising a plurality of pixels from a portion of the second plurality of pixels of the second image configured to completely encompass the interior image and any prior exterior images, a size of each pixel in the plurality of pixels of each exterior image in the set of successive exterior images larger than the particular size and the size of the plurality of pixels of any prior exterior image, the size of each pixel in the plurality of pixels of each exterior image in the set of successive exterior images based on a factor of the size of a side of the interior image divided by the size of the side of the interior image minus two pixels;

receive a selection of a zoom level in the set of successive zoom levels; and generate a target image based on the selected zoom level and the source image.

16. The system of claim 15, wherein generating the target image comprises:

determining a subset of the set of successive exterior images based on the selected zoom level; and generating pixels of the target image based on the subset of the set of successive exterior images.

17. The system of claim 15, wherein the instructions further cause the at least one processing unit to display the target image on a display of the system.

18. The system of claim 15, wherein generating the source image comprises:

dividing the set of successive exterior images into a plurality of groups of successive exterior images; and generating a plurality of subimages, each subimage in the plurality of subimages comprising an interior image and a subset of the plurality of groups of successive exterior images.

19. The system of claim 18, wherein generating the target image comprises:

identifying the subset of the plurality of groups of successive exterior images corresponding to the selected zoom level; and generating the target image based on the identified subset of the plurality of groups of successive exterior images.

20. The system of claim 15, wherein generating the target image comprises, for each pixel in the target image, determining colors of the pixel in the target image based on colors of pixels in the source image overlapped by the pixel in the target image and areas of portions of the pixels in the source image overlapped by the pixel in the target image.

* * * * *